US005124842A

United States Patent [19]
Honda et al.

[11] Patent Number: 5,124,842
[45] Date of Patent: Jun. 23, 1992

[54] IMAGE INPUT/OUTPUT APPARATUS

[75] Inventors: Toshio Honda, Yokohama; Nagaaki Ohyama, Kawasaki; Susumu Kikuchi, Hachioji, all of Japan

[73] Assignee: Olympus Optical Co., Ltd., Tokyo, Japan

[21] Appl. No.: 707,270

[22] Filed: May 24, 1991

Related U.S. Application Data

[63] Continuation of Ser. No. 410,644, Sep. 21, 1989, abandoned.

[30] Foreign Application Priority Data

Oct. 3, 1988 [JP] Japan .................. 63-249431

[51] Int. Cl.$^5$ .................. G02B 27/46; G06E 3/00; G06F 15/336
[52] U.S. Cl. .................. 359/561; 359/560; 382/42; 364/822
[58] Field of Search .................. 350/162.13, 162.21, 350/162.12, 162.14; 358/101, 452, 453, 476, 78; 354/403; 382/43, 42; 364/725-726, 822

[56] References Cited

U.S. PATENT DOCUMENTS

| | | | |
|---|---|---|---|
| 4,462,046 | 7/1984 | Spight | 350/162.13 |
| 4,591,904 | 5/1986 | Urabe et al. | 358/75 |
| 4,621,917 | 11/1986 | Kaneda | 354/403 |
| 4,661,986 | 4/1987 | Adelson | 382/41 |
| 4,903,204 | 2/1990 | Dobbins | 364/413.21 |

FOREIGN PATENT DOCUMENTS

| | | |
|---|---|---|
| 2020618 | 11/1971 | Fed. Rep. of Germany . |
| 3905619 A1 | 8/1989 | Fed. Rep. of Germany . |
| 1-309478 | 12/1989 | Japan . |
| 2-192276 | 7/1990 | Japan . |

OTHER PUBLICATIONS

Digital Image Processing, John Wiley & Sons, 1978, New York, New York, pp. 378-383, chapter entitled, "Algebraic Spatial Image Restoration Techniques".
Takatoshi Ota, Kokichi Sugihara, and Noboru Sugie, Journal of the Institute of Electronic and Communication Engineers (D), J66-D, 1245, (1983).
Journal of the Optical Society of America, vol. 50, No. 8, pp. 749-753, "Use of Annular Apertures to Increase Focal Depth", by W. T. Welford.
Applied Optics, vol. 24, No. 14, Jul. 1985, pp. 2076-2080, "Digital Composition of Images with Increased Depth of Focus Considering Depth Information" by Sugimoto et al.

*Primary Examiner*—Bruce Y. Arnold
*Assistant Examiner*—James Phan
*Attorney, Agent, or Firm*—Frishauf, Holtz, Goodman & Woodward

[57] ABSTRACT

An image input/output apparatus which can reproduce an image having a large focal depth, without decreasing the resolution and luminance. The apparatus has a wide range of practical applications, and can be, easily, quickly and exactly put to practical use. The apparatus includes a mechanism for inputting a plurality of images focused on different object planes, circuitry for Fourier-transforming the images input by the inputting mechanism circuitry for weighting and adding the images Fourier-transformed by the Fourier-transforming circuitry, and circuitry for performing an inverse Fourier transform of Fourier spectrum images obtained by the weighting and adding circuitry.

10 Claims, 18 Drawing Sheets

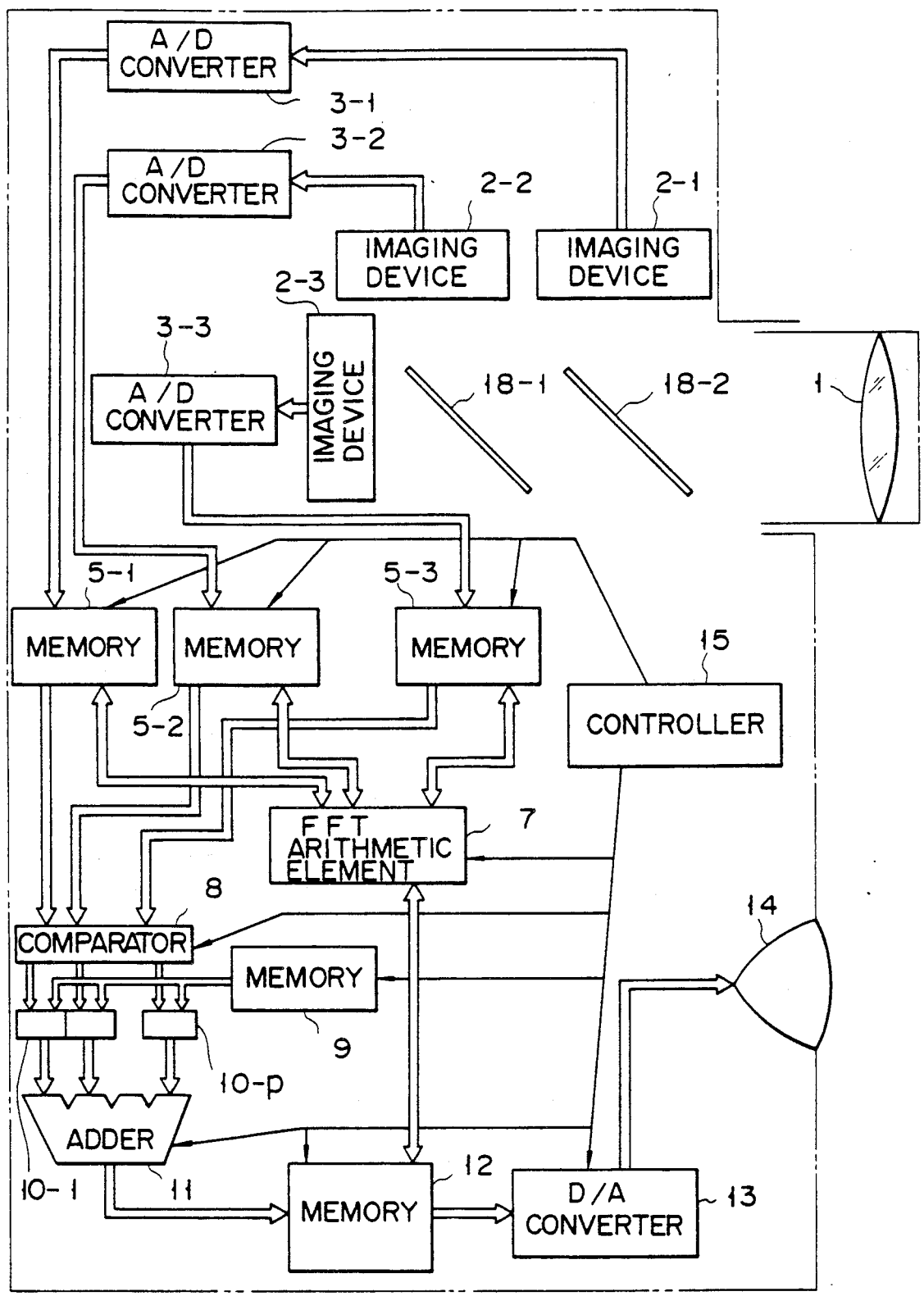
F I G. 5

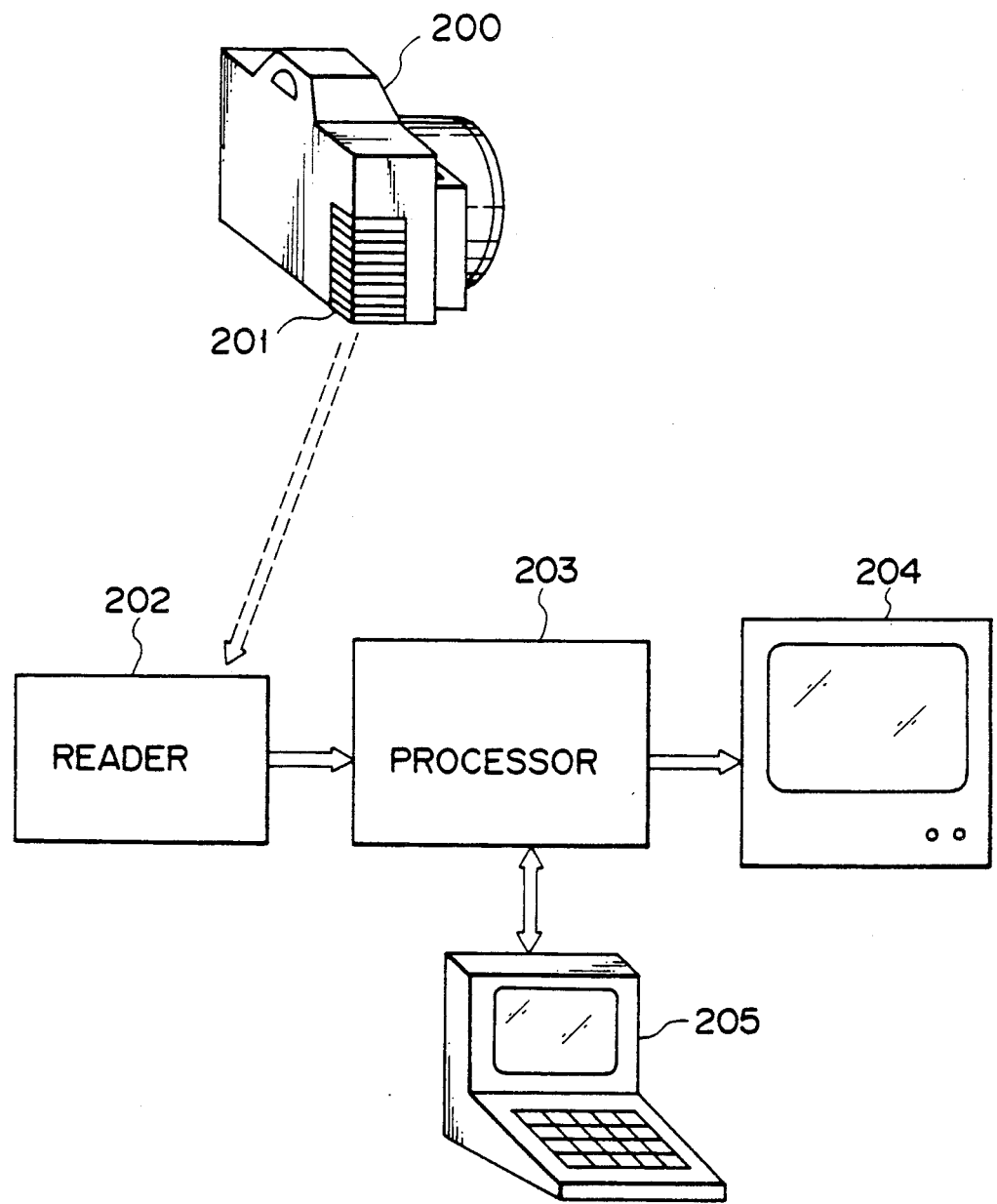
F I G. 7

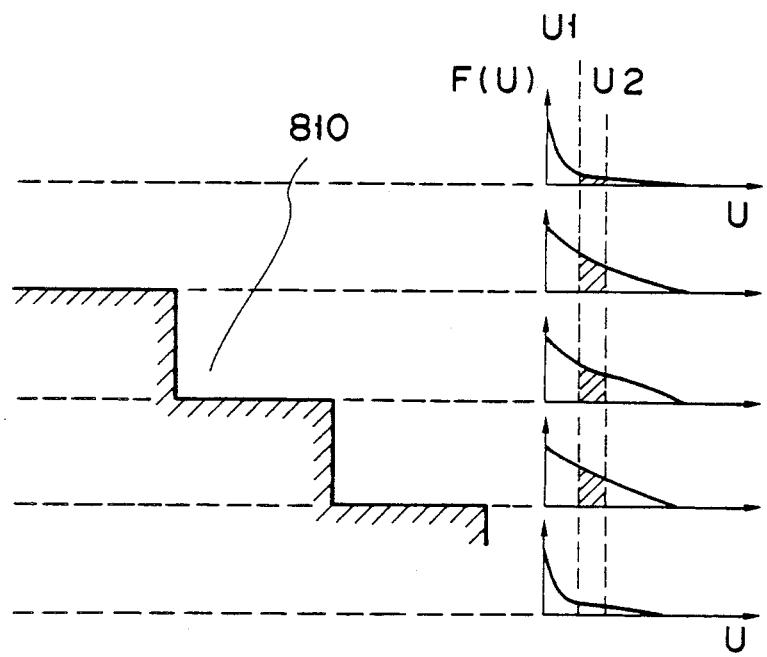
F I G. 14
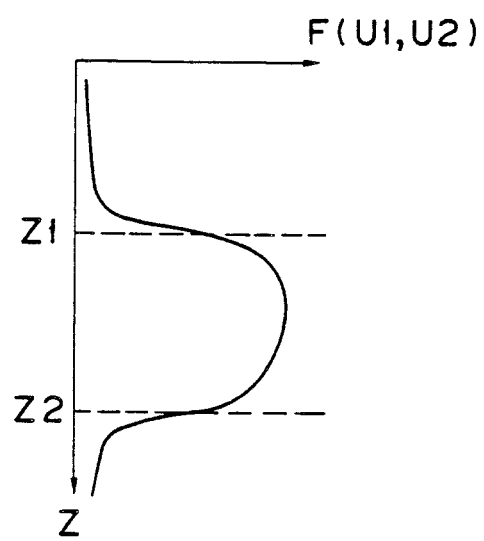
F I G. 15

IMAGE INPUT/OUTPUT APPARATUS

This application is a continuation of application Ser. No. 410,644, filed Sep. 21, 1989 now abandoned.

BACKGROUND OF THE INVENTION

1. Field of the Invention

The present invention relates to an image input/output apparatus for inputting/outputting image information.

2. Description of the Related Art

A focusing optical system having an optical element of a large aperture size is required to optically read an image having a high resolution, a high magnification, and a high luminance. Conventional focusing optical systems represented by lenses have smaller focal depths when their aperture sizes are increased. In the fields of applications which utilize image equipment such as microscopes, cameras, and endoscopes, the resultant images preferably have high resolutions and luminances and at the same time have large focal depths.

A conventional technique for obtaining an image having a large focal depth is described in "W. T. Welford, Journal of Optical Society of America, Vol. 50, P. 749 (1960)". This technique describes a means which utilizes a focusing optical system having a special aperture such as a zone plate. According to this means, an image having a large focal depth can be advantageously obtained. However, the resolution and the light amount are greatly decreased, resulting in inconvenience.

Another technical means is a method which uses an image processing technique described in "S. A. Sugimoto and Y. Ichioka, Applied Optics Vol. 24, P. 2076 (1985)" or "Takatoshi OTA, Kokichi SUGIHARA, and Noboru SUGIE, Journal of the Institute of Electronic and Communication Engineers (D), J66-D, 1245, (1983)". According to this method, a plurality of images having different focal points (to be referred to as in-focus positions) in an object space to obtain local dispersion information, and portions in the in-focus state are synthesized. According to this means, an image having a large focal depth can be synthesized without decreasing the resolution and luminance. The above means can be deemed as an effective means in this respect. However, when an object has a smooth surface or different projections at different positions, it is difficult to apply the above method to such an object. In addition, large hardware is required to realize the method, and an algorithm is complicated, thus posing many practical problems.

The conventional technical means described above have the following drawbacks.

(1) In the means for increasing the focal depth by utilizing a focal optical system having a special aperture such as a zone plate, the resolution and the light amount are greatly decreased. Although it is possible to obtain an image having a large focal depth, the resolution and luminance of the image are lost. Therefore, this mean cannot serve as an optical system which satisfies all factors, i.e., a focal depth, a resolution, and a luminance.

(2) In the means for inputting a plurality of images having different in-focus positions and synthesizing partial images of the in-focus state on the basis of the local dispersion information, applications are limited depending on conditions of the objects, thus posing practical problems.

The inventors of the present invention made studies for solving the above problems of the prior art, and succeeded in devising a novel image input/output apparatus which can reproduce an image having a large focal depth, without decreasing the resolution and luminance, and which has a variety of practical applications for objects. The present applicant (assignee) already filed Japanese Patent Application No. 63-039936 for this apparatus. According to the technical means employed in this apparatus, a plurality of images having different in-focus positions are input and added, and the resulting images are subjected to suitable recovery processing thereby to form an image having a large focal depth. This technical means can bring about remarkable advantages, with a simple structure. However, the following problem remains to be solved: it is difficult to quickly and exactly obtain suitable recovery processing means to be applied to the added image. In other words, in order to obtain an optimal recovery filter, complex and troublesome calculations or preliminary experiments need to be performed.

SUMMARY OF THE INVENTION

The object of the present invention is to provide an image input/output apparatus having various advantages, that is, the apparatus can reproduce an image having a large focal depth without lowering the resolution and luminance, has a wide range of practical applications for objects, and can be quickly and exactly put to practical use.

In order to achieve the object of the present invention, the following steps are executed:

(1) A plurality of images having different in-focus positions are input;

(2) The input images having different in-focus positions are Fourier-transformed;

(3) The Fourier-transformed images having the different in-focus positions are weighted in units of spatial frequencies, and the weighted images are synthesized; and (4) The synthesized Fourier spectrum image is then inverse Fourier-transformed.

The above steps produce the following function. The images having different focal positions are discretely input, and synthesis of the Fourier-transformed image is performed. The resultant Fourier spectrum image is then inverse Fourier-transformed. Therefore, an image having a large focal depth can be obtained without decreasing the resolution and luminance. In addition, processing can be performed without difficulty regardless of different conditions and natures of the surfaces of the objects and ca be used in a variety of applications. Furthermore, special preparation and special input operations need not be performed. Therefore, the present invention can be appropriately used in practical applications without modifications.

BRIEF DESCRIPTION OF THE DRAWINGS

FIGS. 1 to 16 show embodiments of the present invention; in which

FIG. 1 is a view showing an arrangement of a first embodiment;

FIG. 2 is a view for explaining an operation of the first embodiment;

FIG. 3 is a view showing an arrangement of a second embodiment;

FIG. 4 is a view for explaining an operation of the second embodiment;

FIG. 5 is a view showing an arrangement of a third embodiment;

FIG. 6 is a view showing an arrangement of a fourth embodiment;

FIG. 7 is a view showing an arrangement of a fifth embodiment;

FIG. 9 is a plan view showing a structure of a recovery color filter in the sixth embodiment;

FIG. 10 is a view showing an arrangement of a seventh embodiment;

FIG. 12 is a view for explaining an operation of the eighth embodiment;

FIG. 13 is a view showing an arrangement of a ninth embodiment;

FIGS. 14 and 15 are views for explaining an operation of the ninth embodiment; and FIG. 16 is a view showing an arrangement of a tenth embodiment.

DETAILED DESCRIPTION OF THE PREFERRED EMBODIMENTS

First Embodiment

Figure 1:
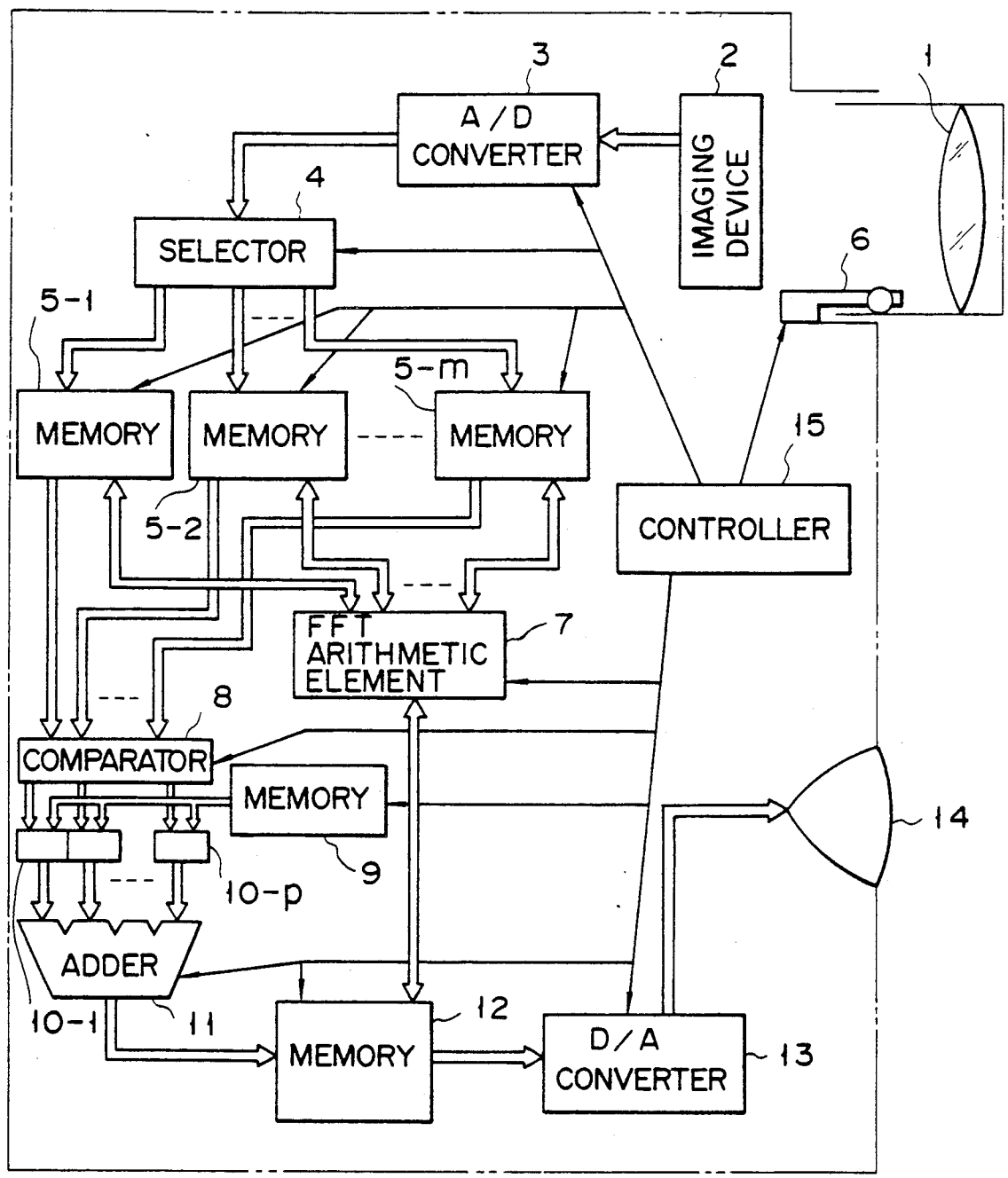

FIG. 1 is a view showing an arrangement of a first embodiment of the present invention. An object image is focused on a light-receiving portion of an imaging device 2 consisting of a Charge-Coupled Device (to be referred to CCD hereinafter) or imaging tube through a lens 1 shown in an upper right portion in FIG. 1. An input optical system normally includes a plurality of lenses, but only one lens is shown for illustrative convenience. An output signal, i.e., an image signal from the imaging device 2 is converted into a digital signal by an A/D converter 3. The digital signal is stored in a predetermined one of memories 5-1 to 5-m which is selected by a selector 4. The above operations are performed such that the in-focus position is discretely changed by an in-focus position controller 6 at predetermined intervals within a predetermined distance range. The n (n≦m) input images are respectively stored in the n memories of the memories 5-1 to 5-m. The images stored in the memories 5-1 to 5-m are Fourier-transformed, and the results are stored in the memories 5-1 to 5-m again. The Fourier-transformed image signals stored in the memories 5-1 to 5-m are supplied to a comparator 8. The comparator 8 compares spectral intensities of the Fourier-transformed images in units of spatial frequencies. The Fourier-transformed images are reordered from the higher- to lower-intensity images. These image signals are transferred to multipliers 10-1 to 10-P (P≦m). Factors or coefficients set in a memory 9 are supplied to the multipliers 10-1 to 10-P as multipliers. The multipliers 10-1 to 10-P multiply the coefficients with the Fourier-transformed image signals from the comparator 8. The output signals from the multipliers 10-1 to 10-P are supplied to and added by an adder 11. A synthesized image signal from the adder 11 is stored in a memory 12. The Fourier-transformed images weighted and added in the units of spatial frequencies and recorded in the memory 12 are then inverse Fourier-transformed by the FFT arithmetic element 7. The result from the arithmetic element 7 is stored in the memory 12 again. The processed image signal stored in the memory 12 is converted into an analog signal by a D/A converter 13. The analog signal is displayed on a display monitor 14.

The control of timings and signal flows of the above operations is performed by a controller 15.

A lookup table may be used in place of the factor setting memory 9 and the multipliers 10-1 to 10-P, and predetermined factors may be multiplied by table conversion. The original image signals recorded in the memories 5-1 to 5-m may be recorded in another recording medium such as a floppy disk, a magnetic tape, an optical memory, or the like. The image input recording and reproduction units may be off-line connected such that the image signal read out from this external recording medium can be subjected to the Fourier transform, additions with weighting, and inverse the Fourier transform during image reproduction. The weighting factors or coefficients used during additions with weighting in units of spatial frequencies may be fixed from the beginning, or one of the plurality of factors prestored in the memory 9 may be selected by an operator. Alternatively, the content of the memory 9 may be updated.

Figure 2:
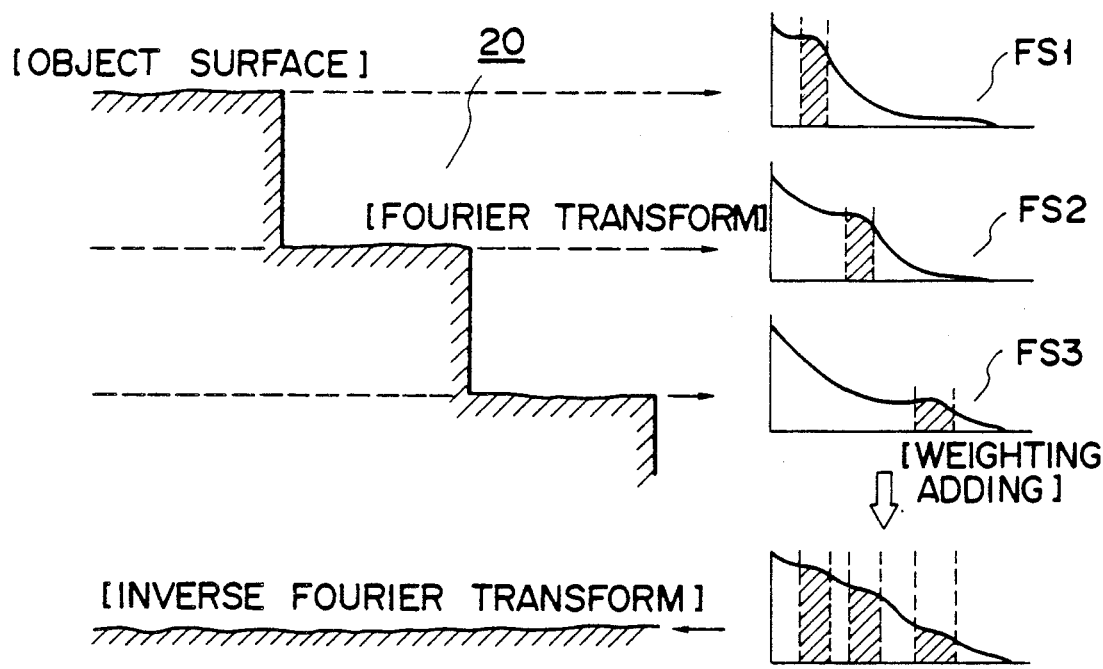

The first embodiment having the above arrangement has the following effect. Assume an object 20 having a stepwise structure shown in FIG. 2. The respective surfaces of the stepwise portions of the object 20 have natural frequencies. When the object 20 having projections in the direction of depth is observed with an optical system having a relatively small focal depth, a focused surface can be clearly observed, but other surfaces are out of focus. When a given surface is focused, its input image has a frequency unique to this surface. Therefore, the Fourier spectra FS1, FS2, FS3, ... of the input images focused on the respective surfaces have natural spatial frequency data of the respective surfaces. When the Fourier spectra FS1, FS2, FS3, ... of the plurality of input images are weighted and added in units of the spatial frequencies while the focal position is changed, thereby obtaining synthesized Fourier spectrum of an image including spatial frequency data of all the surfaces.

In this case, the following weighting technique is used. A given spatial frequency is taken into consideration, and spectral intensities of the frequencies are compared between the images having different in-focus positions. "1" is multiplied with the image having the highest spectral intensity, and "0" is multiplied with the remaining images, or "4", "3", "2", and "1" are weighted to the images from the higher spectral intensities of the frequency. Alternatively, weighting may be performed in proportion to the spectral intensities. When almost only noise appears in a high-spatial frequency region, identical weighting factors or coefficients are used, or "0"s are respectively multiplied with the images, thereby reducing noise. The weighting techniques can be appropriately selected in accordance with features of the object or optical system.

The resultant Fourier spectrum image is subjected to inverse Fourier transform to obtain an image having a substantially large focal depth. For the sake of descriptive simplicity, a one-dimensional Fourier transform technique is used. However, a two-dimensional Fourier transform is actually used.

Second Embodiment

Figure 3:
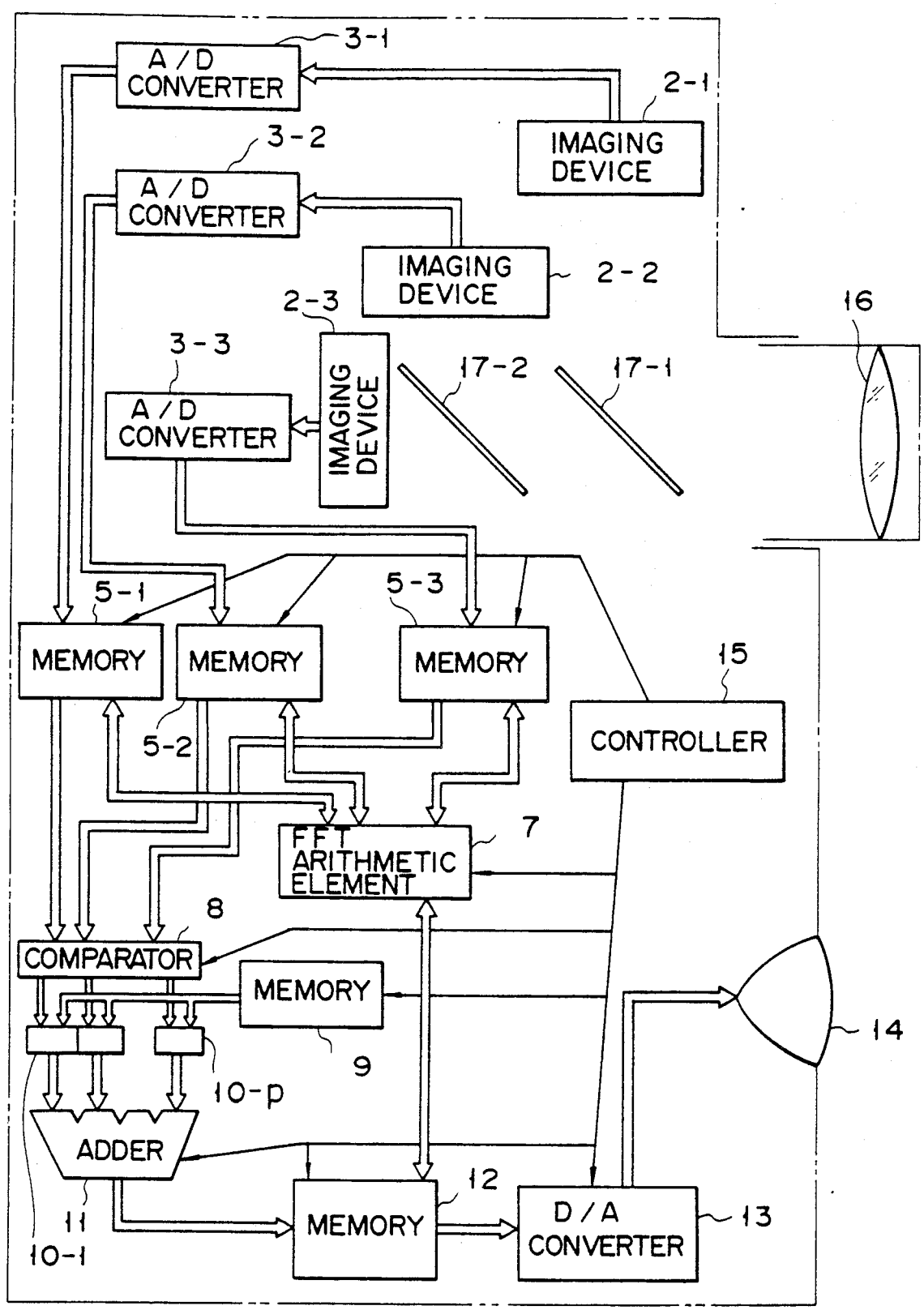

FIG. 3 is a view showing an arrangement of a second embodiment of the present invention. In this embodiment, an optical element, e.g., a lens 16, designed to intentionally cause chromatic aberration in an image input optical system is used. In addition, dichroic mirrors 17-1 and 17-2 are arranged behind the lens 16. Images having different wavelength ranges are formed by imaging devices 2-1 to 2-3. The dichroic mirrors 17-1 and 17-2 can be mirrors having filter characteristics shown in FIG. 4.

Figure 4:
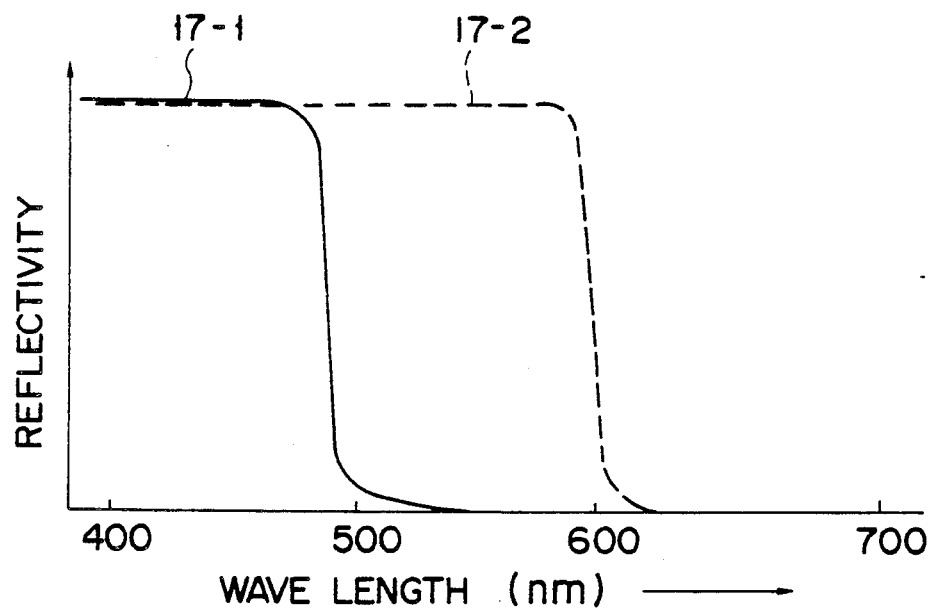

As shown in FIG. 4, the mirror 17-1 comprises a mirror which can reflect light of a blue region and transmit light having a wevelength larger than that of green. The mirror 17-2 comprises a mirror which can reflect light having a wavelength smaller than that of green and transmit red light therethrough. With this arrangement, an image of a blue region is input to the imaging device 2-1; a green image, to the imaging device 2-2; and a red image, to the imaging device 2-3.

Referring back to FIG. 3, the image signals from the imaging devices 2-1 to 2-3 are converted into digital signals by A/D converters 3-1 to 3-3, respectively. The digital signals are stored in memories 5-1 to 5-3. Other points in this embodiment are the same as those in the first embodiment, and a detailed description thereof will be omitted.

In this embodiment, the image is divided into the three components, i.e., blue, green, and red components. However, the present invention is not limited to this. For example, the number of bands may be increased to four or more or limited to two. In addition, an interference filter may be used to input an image having a narrow specific wavelength range. A plurality of different band-pass and color filters may be used in place of the dichroic mirrors 17-1 and 17-2, and these filters are switched to cause one imaging device 2 to input images having a multiple band.

The second embodiment having the above arrangement has the following effect. The reflection spectral characteristics of a general object are distributed in a wide range substantially corresponding to the entire range of visible light. Images at the respective wavelengths have strong correlation. That is, by using an optical element which intentionally cause chromatic aberration, images having different focal positions corresponding to the wavelengths are focused, and images having substantially different in-focus positions can be simultaneously input. Therefore, since the images focused at a plurality of positions can be input without performing a mechanical operation for changing the in-focus position, an apparatus free from "blurring" or the like caused by mechanical movement can be obtained.

Third Embodiment

FIG. 5 is a view showing an arrangement of a third embodiment of the present invention. In the third embodiment, half mirrors 18-1 and 18-2 are arranged behind a lens 1 in an image input optical system, and distances between the lens 1 and imaging devices 2-1 to 2-3 are set to be different from each other. Other arrangements are the same as those in the second and first embodiments, and a detailed description thereof will be omitted.

The imaging devices 2-1 to 2-3 may be moved to properly set their positions in accordance with types of object.

The third embodiment having the above arrangement has the following effect. In this embodiment, the images focused on the plurality of different planes are input, and the plurality of images having different in-focus positions can be simultaneously input. Therefore, a simple apparatus can be obtained wherein the mechanical operation for changing the in-focus position need not be performed, and application fields of the apparatus can be widened.

Fourth Embodiment

Figure 6:
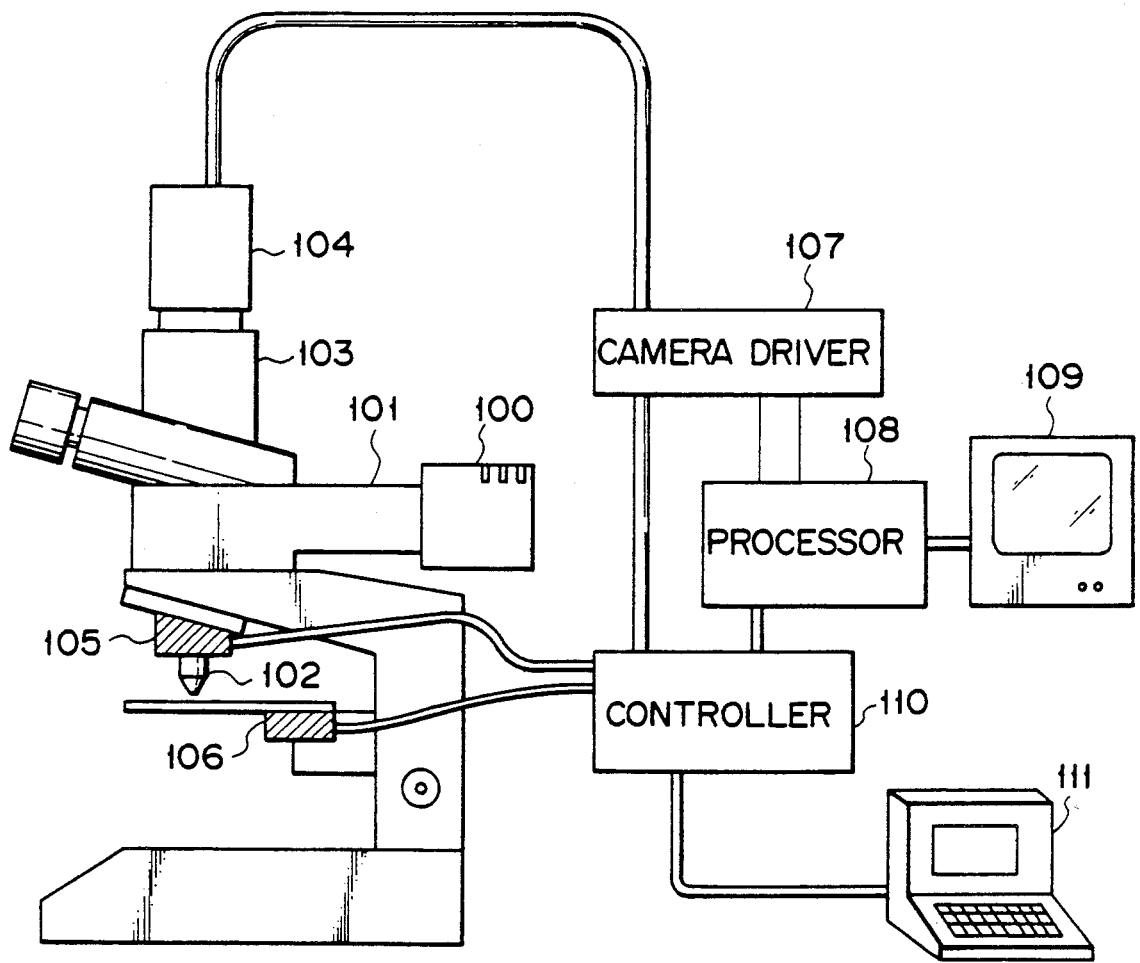

FIG. 6 is a view showing an arrangement of a fourth embodiment of the present invention. This embodiment exemplifies an application in which the present invention is applied to a reflection microscope. As shown in FIG. 6, light emitted from an illumination source 100 is guided by downward illumination equipment 101 and is incident on the surface of a sample through an objective lens 102. An image of light reflected by the sample is focused by the objective lens 102 and is imaged by a TV camera 104 arranged on the upper end of a lens barrel 103. In this case, an in-focus plane for the sample is continuously changed by a focus level driver 105 within a preset period of time. The image inputs during this period are accumulated in a light-receiving element of the TV camera 104. The sample is moved by an X-Y stage controller 106 in the X and Y directions. The images stored within the preset period of image are read by a reader in the TV camera 104 and is transferred to a camera driver 107 as an electrical signal. The camera driver 107 also controls power supply or the like of the TV camera 104. An image signal transferred to the camera driver 107 is supplied to a processor 108. The processor 108 includes an A/D converter, an image memory, an FFT arithmetic element, a comparator, a weighting and adding device, and a D/A converter. The processor 108 subjects the input images having different in-focus positions to the processing of the present invention. The processed result in supplied to a TV monitor 109 and displayed on it. The above operations are repeatedly performed for different portions of the sample under control of the X-Y stage controller 1067, and the processed results are sequentially displayed. The microscope of this embodiment is entirely controlled by a controller 110, and conditions are input by an observer through a man-machine interface 111.

According to this embodiment, synthesis of images having a large focal depths can be relatively easily performed while the resolution and luminance of the object are kept maintained on the microscope. When a very small structure is to be observed with a microscope, an objective lens having a high magnification must be used. In general, the higher the magnification becomes, the larger the N.A (numerical aperture) becomes and the smaller the focal depth becomes. In this case, this embodiment can be employed as an effective method of displaying an image having a small focal depth. In particular, in observation using a microscope, a troublesome focus level setting operation, which is required because of small focal depth, becomes unnecessary. Thus, the observation can be remarkably facilitated. The arrangement of the present invention can be used in a variety of applications for observing various types of objects in many fields of mining, paper, fiber, living organism industries in addition to testing of ICs and LSIs.

This embodiment exemplifies an application of a reflection microscope. However, the present invention is also applicable to a transmission microscope, a fluorescent microscope, and the like. An adder may be arranged in the processor 108 to input and add the images in the same manner as in the first embodiment of the present invention.

Fifth Embodiment

FIG. 7 is a view showing an arrangement of the fifth embodiment of the present invention. This embodiment exemplifies an electronic camera which employs the present invention. This embodiment corresponds to an arrangement in which the image input unit and the image processing/display unit in the first to third embodiments are off-line connected through a recording medium. As shown in FIG. 7, a plurality of images obtained by an electronic camera 200 and focused at different focal points are input to the camera 200 as electrical signals. All the input electrical signals are recorded in a recording medium 201 in the camera 200. The recording medium 201 comprises a floppy disk, a magnetic tape, an optical memory, a solid-state memory using a semiconductor IC or a thin film or the like. The image signals recorded in the recording medium 201 are read by a reader 202. The image signals recorded in the image recording medium are analog signals. An A/D converter is arranged in the reader 202 to convert the image signal into a digital signal. A processor 203 includes the memories 5-1 to 5-m, the FFT arithmetic element 7, the comparator 8, the memory 9, multiplier 10, the adder, the memory 12, the D/A converter 13, and the controller 15, all of which are shown in the first to third embodiments. The same processing as in the first to third embodiments are performed for a digital image signal transferred from the reader 202 in the processor. The processed image signal is transferred to an displayed on a TV monitor 204. The various processing conditions of the processor 203 are set by an observer at a man-machine interface 205 connected to a controller in the processor 203.

According to this embodiment, the plurality of images having different in-focus positions and imaged by the electronic camera 200 are obtained to provide the same effect as in the first to third embodiments. In particular, when an object is photographed without paying much attention to the focusing of the lens or the diaphragming, an image of the object can be reproduced by freely setting the focal depth. Thus, an image having a large focal depth can be obtained with high luminance and resolution, which has been not realized in an input optical system of a conventional electronic camera. Consequently, the function of the input optical system of the electronic camera can be greatly enhanced.

Sixth Embodiment

Figure 8A:
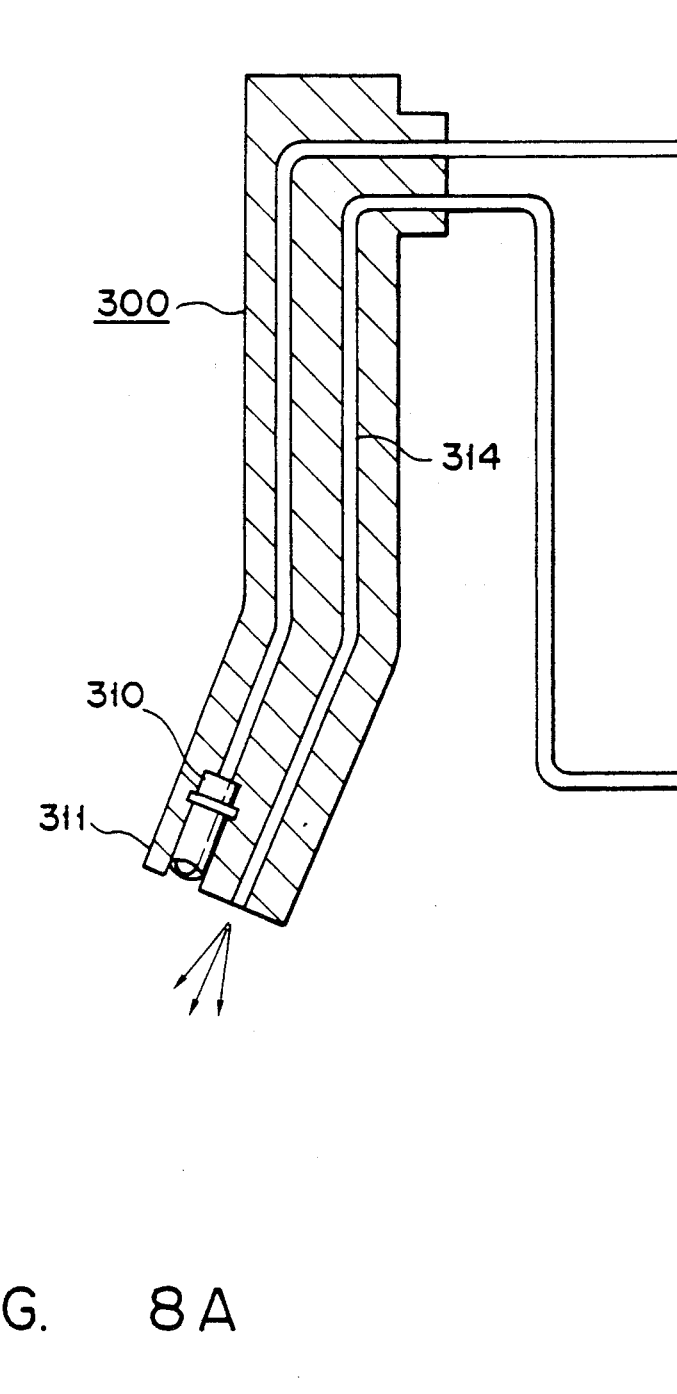
FIGS. 8A to 8C are views showing an arrangement of an sixth embodiment.
Figure 8B:
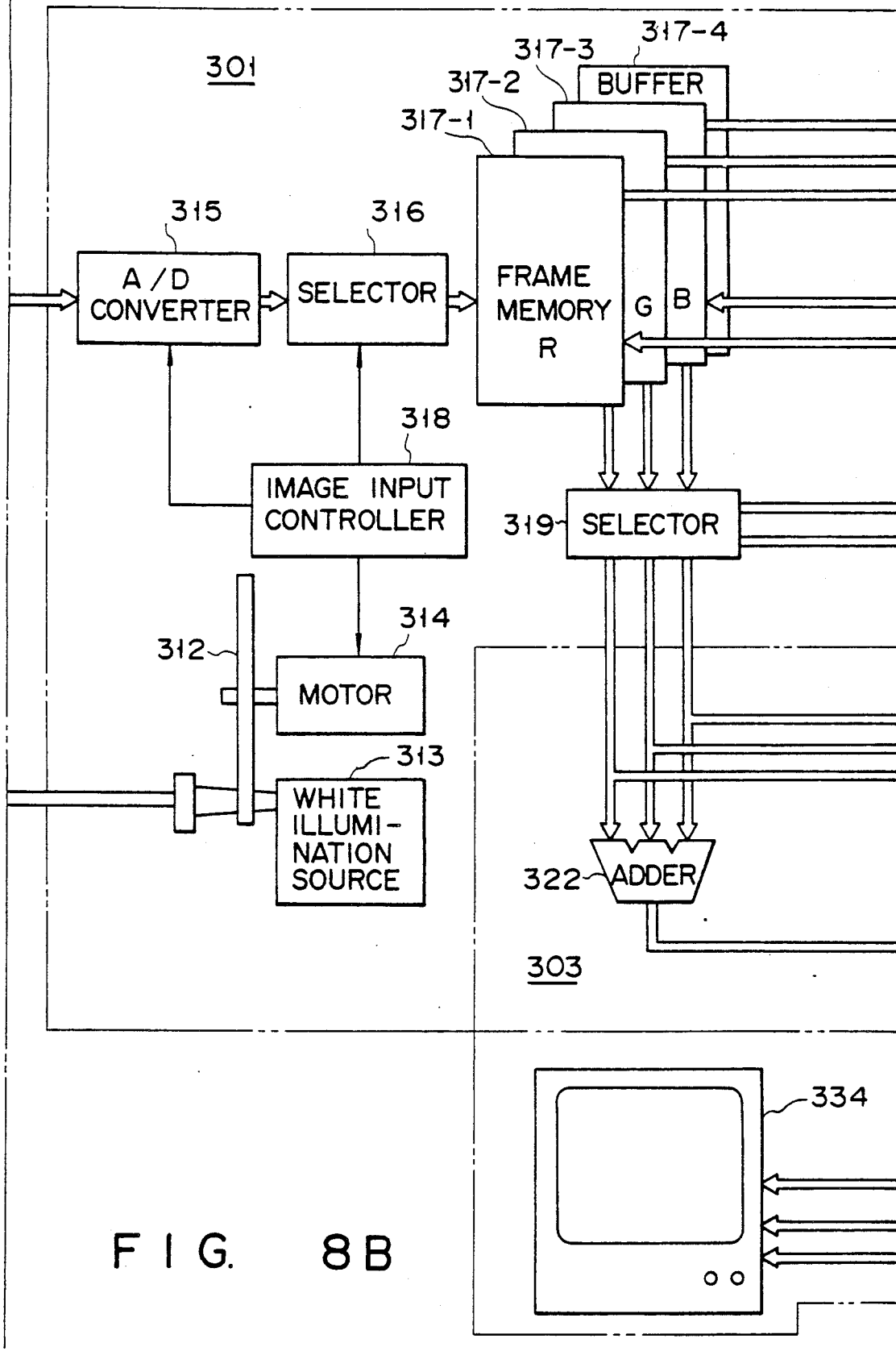
Figure 8C:
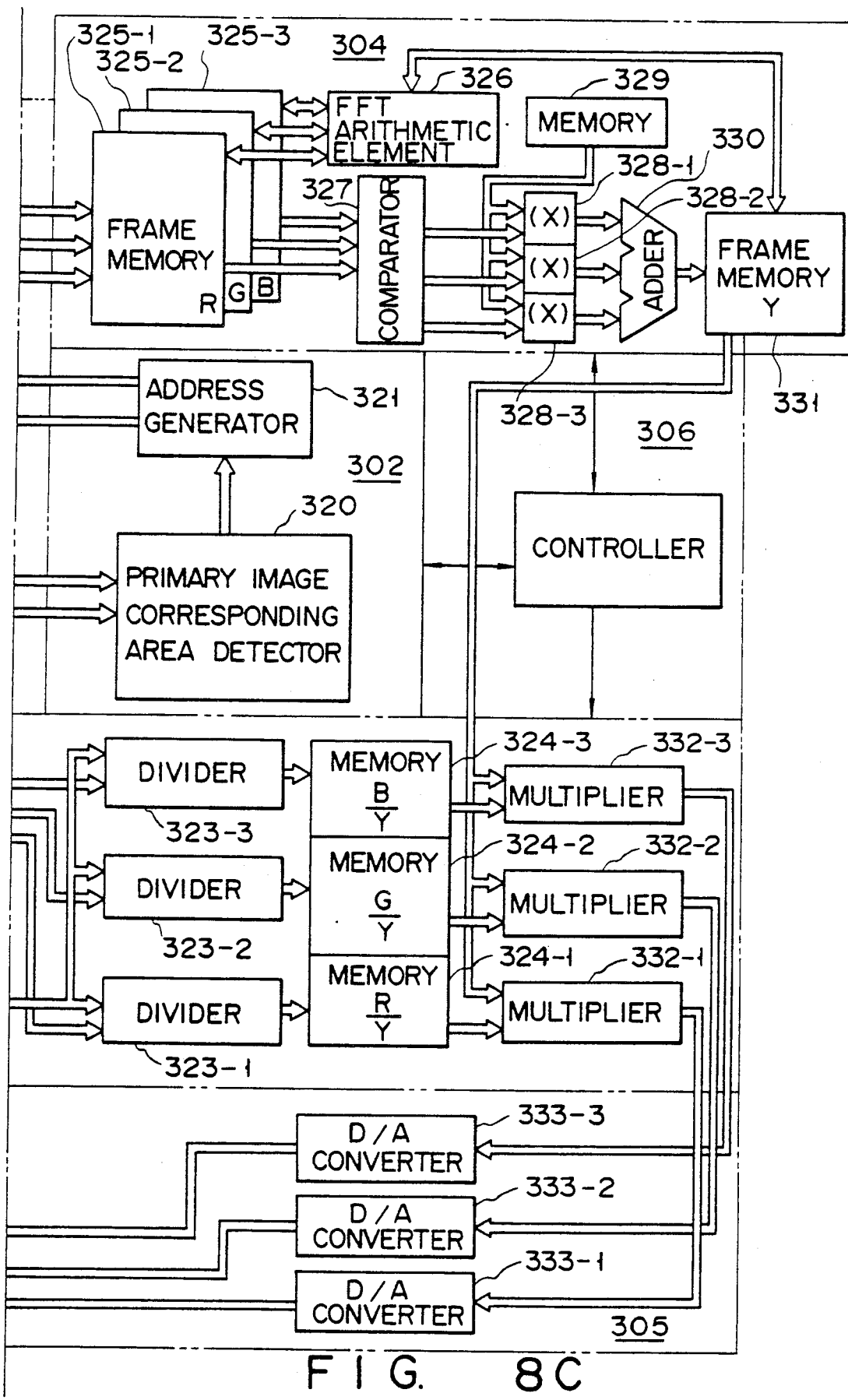

FIGS. 8A to 8C are views showing an arrangement of a sixth embodiment in which the present invention is applied to a surface sequential electronic endoscope. The electronic endoscope mainly comprises an endoscope probe 300, an image input unit 301, a color misregistration correction unit 302, a color information recorder 303, a focal depth increasing unit 304, an image display unit 305, and a controller 306. A monochromatic solid-state imaging device 310 such as a CCD is mounted at the distal end of the endoscope probe 300. An image focused by an objective lens in an in-focus position controller 311 is imaged. In this case, illumination light is obtained as follows. Light from a white illumination source 313 such as a Xe lamp which passes through a rotary color filter 312 arranged in the image input unit 301 i guided into the endoscope probe 300 by light guide 314 of an optical fiber or the like. Light is then output from the distal end of the probe.

Figure 9:
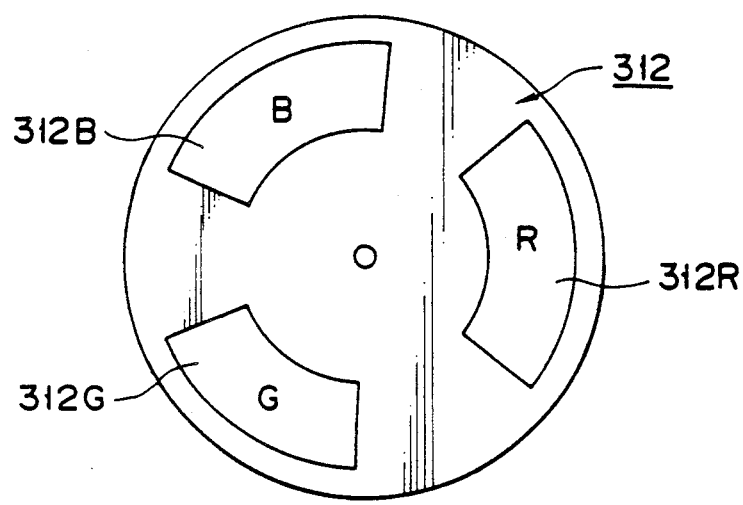

FIG. 9 is a plan view showing a structure of the rotary color filter 312. As shown in FIG. 9, red (R), green (G), and blue (B) spectrum transmission filter elements 312R, 312G, and 312B are intermittently arrange din an angular direction.

Referring back to FIG. 8B, the rotary color filter 312 is driven by a motor 312M in the image input unit 301, and illumination light colors are changed in an order of R, G, and B. For this reason, an object illuminated with light components having these colors is imaged by the imaging device 310 as a monochromatic image. An output image signal from the imaging device 310 is converted into a digital signal by an A/D converter 315 in the image input unit 301, and the digital signal is stored in a corresponding predetermined color area of frame memories 317-1 to 317-3. The above operations are controlled by an image input controller 318. The R and G components or the G and B components of the primary color images, i.e., R, G, and B components sequentially stored in the frame memories 317, are selected by a selector 319. The selected image signals are input to a primary image corresponding area detector 320 in the color misregistration correction unit 302, and misregistration amounts of the R or B image with respect to the G image is locally detected. An address generator 321 generates addresses for correcting the misregistration amounts calculated by the primary image corresponding area detector 320, and these address signals are supplied to the frame memories 317-1 to 317-3. The frame memories 317-1 to 317-3 correct the R and B images by using the address signals and a buffer memory 317-4.

The resultant single color image is input to the color information recording unit 303 through the selector 319. In the color information recording unit 303, the respective color components are added to each other by an adder 322 to obtain a luminance $Y = R + G + B$. At the same time, the color components R, G, and B are divided by Y by dividers 323-1 to 323-3. Quotients R/Y, G/Y, and B/Y from the dividers 323-1 to 323-3 are stored in memories 324-1 to 324-3, respectively.

The R, G, and B images input while changing the focal position by the in-focus position controller 311 in the endoscope probe 300, that is, the R, G, and B images stored in the frame memories 317-1 to 317-3 in the image input unit 301 are recorded in frame memories 25-1 to 325-3 in the focal depth increasing unit 304. In addition to the frame memories 325-1 to 325-3, the focal depth increasing unit 304 includes an FFT arithmetic element 326, a comparator 327, multipliers 328-1 to 328-3, a memory 329, an adder 330, and a frame memory 331. The focal depth increasing unit 304 is operated in the same manner as in the first embodiment, and the processing result is stored in the frame memory 331 as the luminance $Y = R + G + B$.

The color information stored in the memories 324-1 to 324-3 and the image signal stored in the frame memory 331 are multiplied by multipliers 332-1 to 332-3 in units of color components. The products from the multipliers 332-1 to 332-3 are supplied to the image display unit 305.

The signals supplied from the multipliers 332-1 to 332-3 to the image display unit 305 are converted into analog signals by D/A converters 333-1 to 333-3, respectively. The analog signals are displayed on a TV monitor 334 The image processing and display units are controlled by the controller 306.

This embodiment utilizes the strong correlation between the three primary (R, G, and B) endoscopic images and dependency of image defocusing almost on the luminance of the color image components. Images having different focal positions in units of three primaries are input in the surface sequential electronic endoscope, and processing is performed by the means of the present invention.

An operation of this embodiment will be described below. R, G, and B component images are sequentially input by the image input unit 301. In this case, when the object or the endoscope probe 300 itself is abruptly moved, the relative positions of the three primary images are deviated from the proper positions, thus causing so-called color misregistration. The color misregistration correction unit 302 calculates the misregistration amounts of the R and B images with respect to the G image by matching between local partial images. The R and B images are corrected on the basis of the calculated color misregistration amounts. A color image at a preset in-focus position is input by the above method. Data R/Y, G/Y, and B/Y obtained by normalizing the R, G, and B values by the luminance Y=R+G+B are recorded by the color information recording unit 203. The primary color images are input while the focal position is changed, and the input image data are subjected to color misregistration correction. The corrected data are synthesized by the focal depth increasing unit 304 by using the R, G, and B images, thereby obtaining an image having a large focal depth. The resultant image is defined as a new luminance Y' image. Finally, the Y' image is multiplied with the data R/Y, G/Y, and B/Y to obtain a color image having a large focal depth.

This embodiment has an advantage in that an endoscopic image having a large focal depth can be synthesized. In addition, since an objective lens having a large aperture size can be used, the power of the illumination source can be reduced. In addition, the light storage time of the imaging device can be shortened, and an influence of color misregistration can be minimized.

Seventh Embodiment

Figure 10:
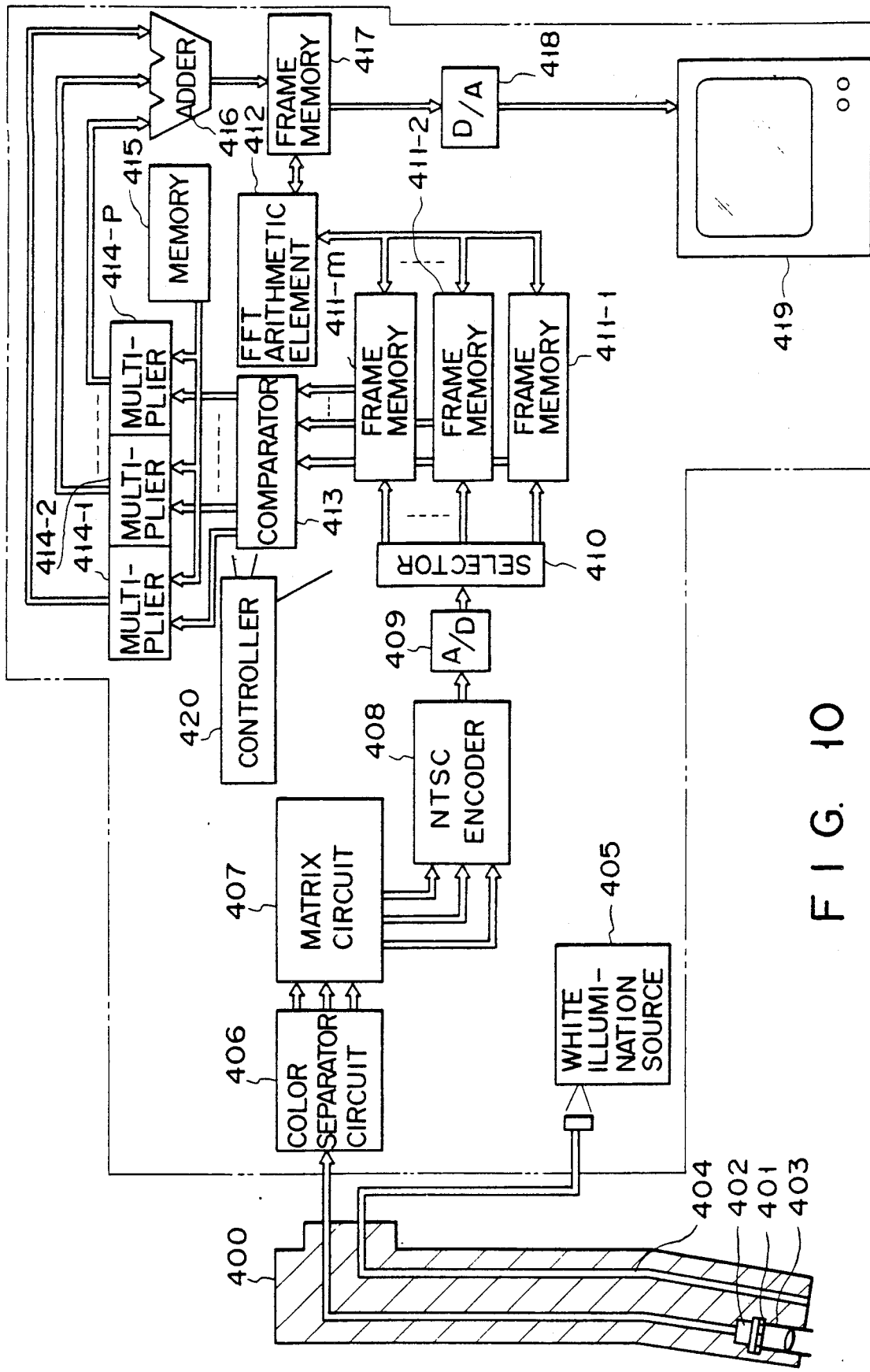
Figure 11A:
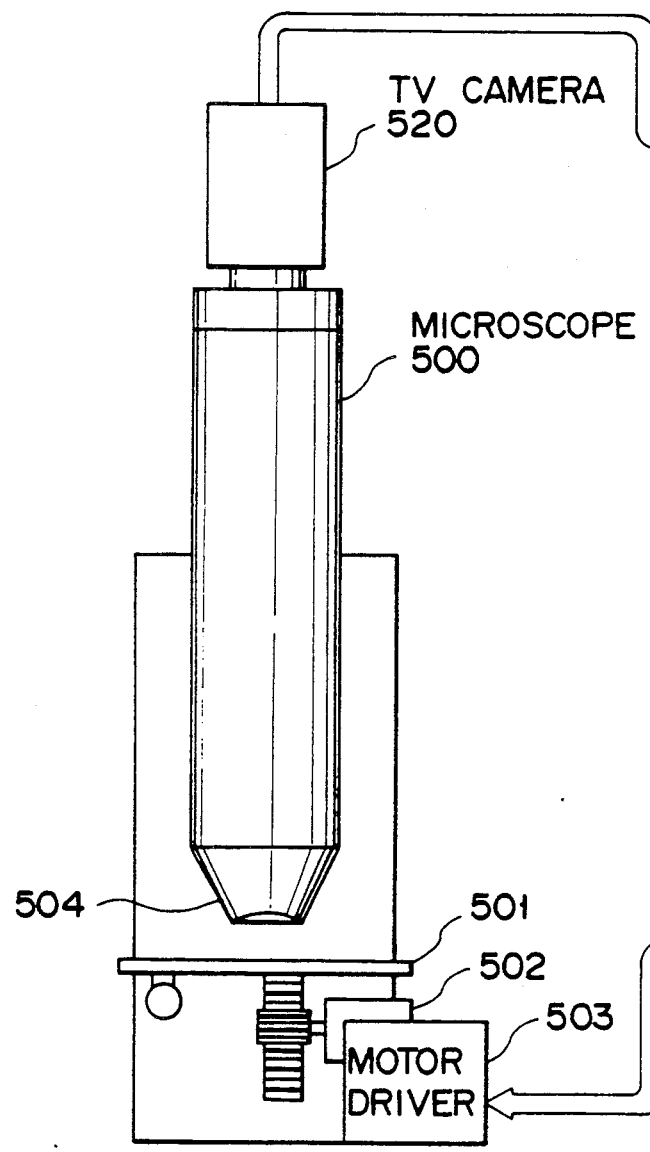
FIGS. 11A to 11D are views showing an arrangement of an eighth embodiment.
Figure 11B:
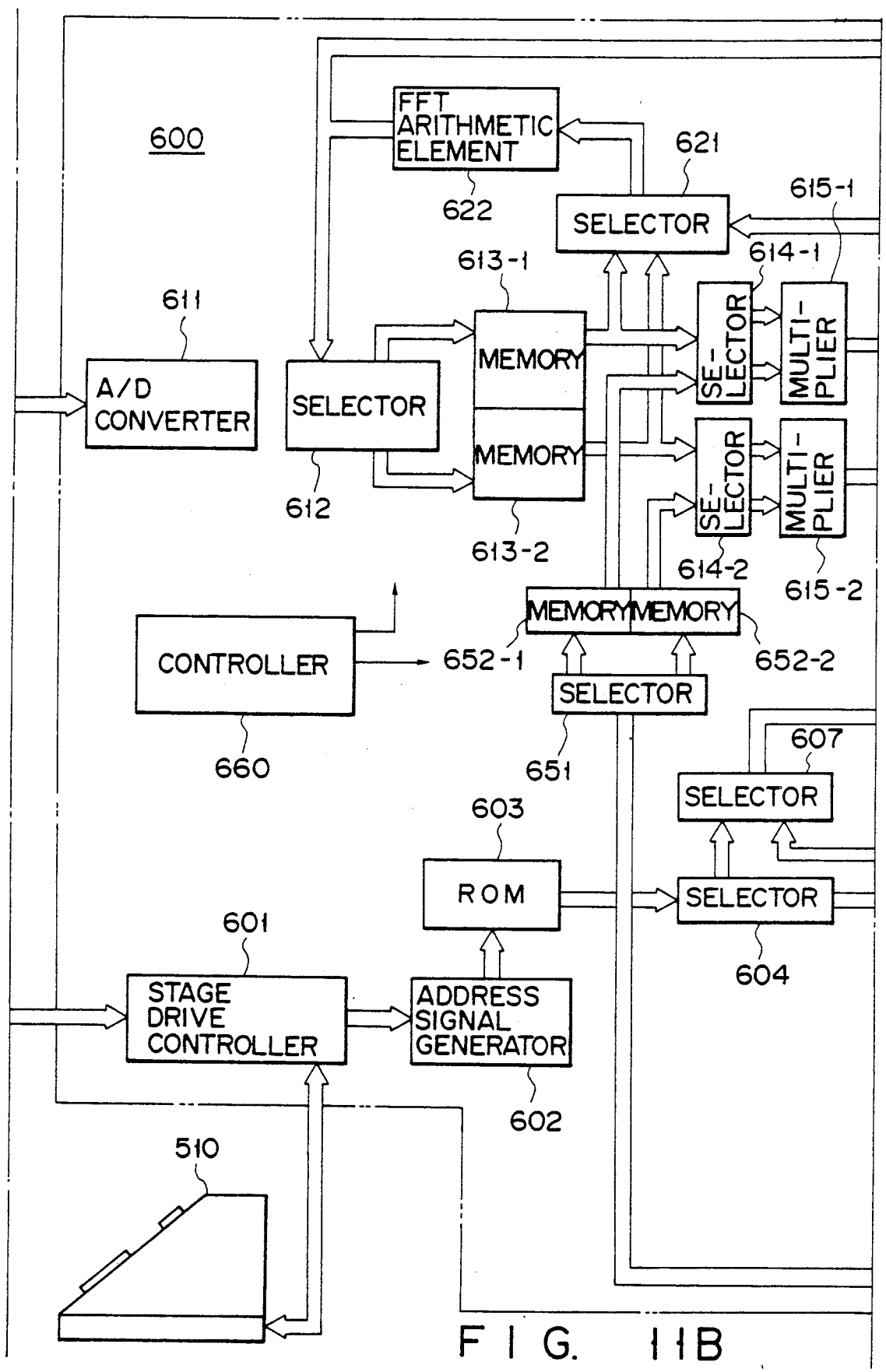
Figure 11C:
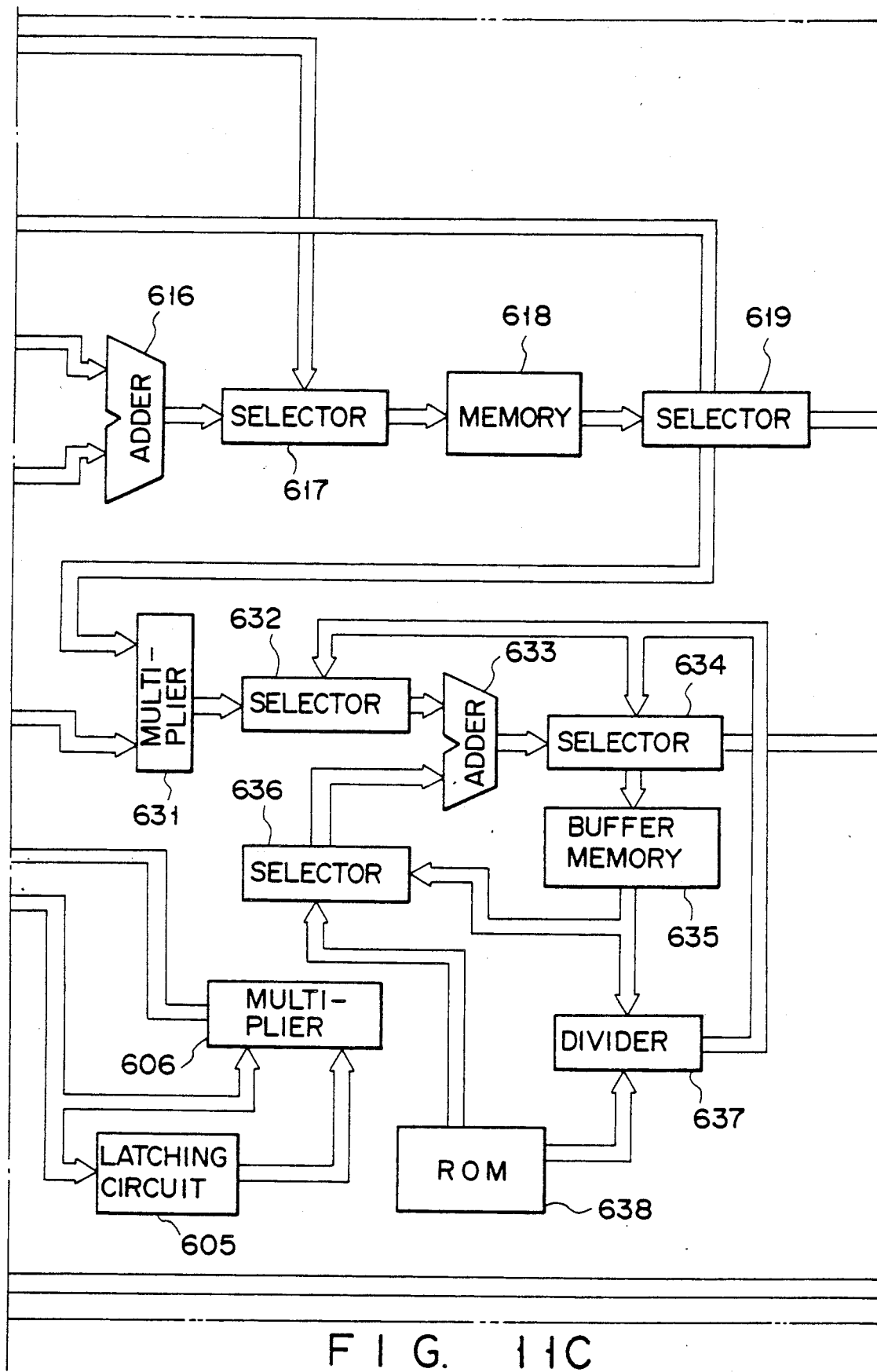
Figure 11D:
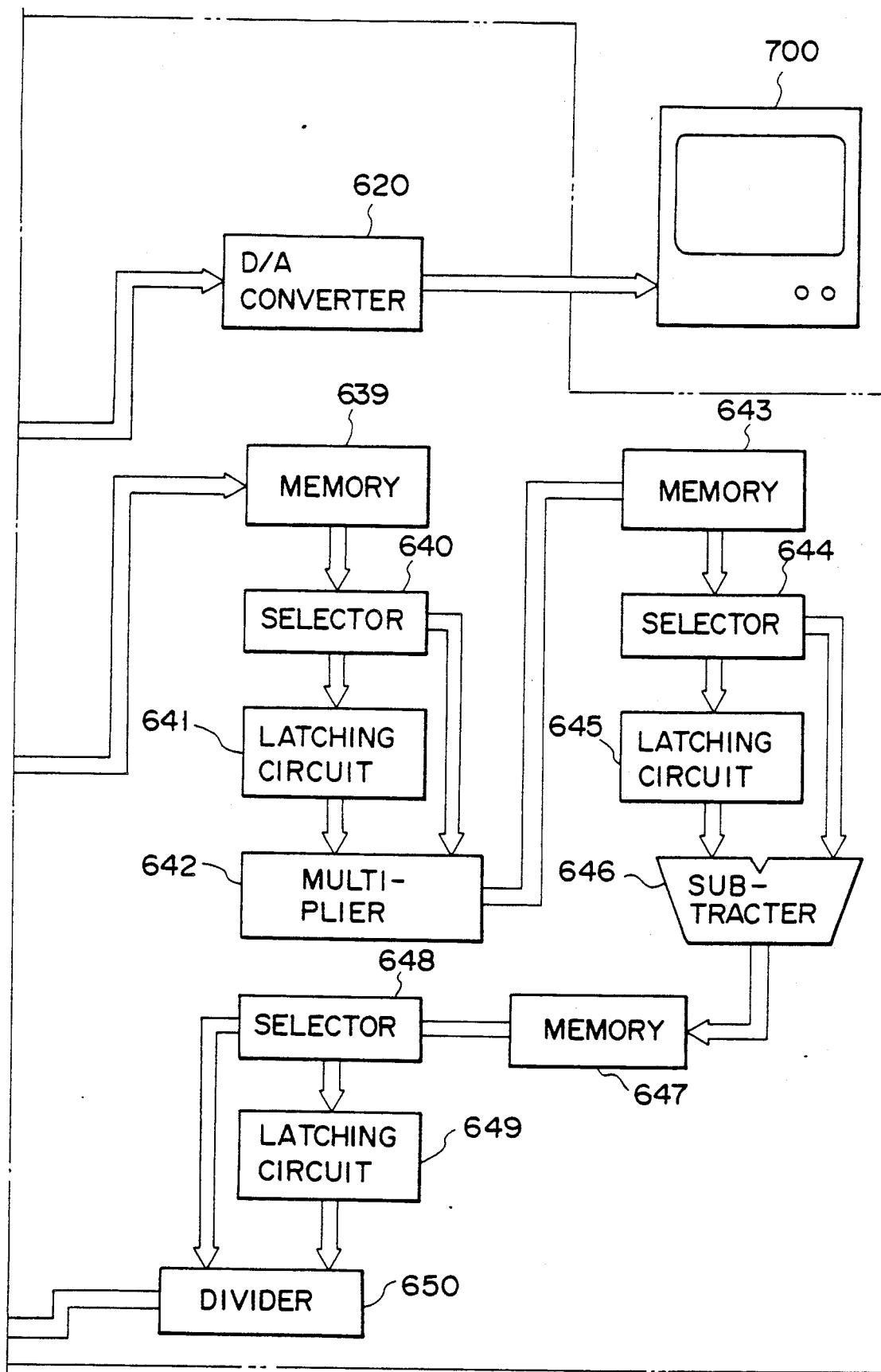

FIG. 10 is a view showing an arrangement of a seventh embodiment in which the present invention is applied to an electronic endoscope using a single-plate color imaging device. As shown in FIG. 10 a solid-state imaging device 402 covered with a color mosaic filter 401, a light-receiving surface of which consists of R, G, and B filter elements, is mounted at the distal end of an endoscope probe 400. An image focused by an objective lens in an in-focus position controller 403 is imaged. In this case, illumination light is produced as follows. Light emitted from a white illumination source 405 in the apparatus housing is guided to the endoscope probe 400 through a light guide 404 and is output from the distal end of the probe. An output signal from the imaging device 402 is separated into R, G, and B color signals by a color separator circuit 406. In this embodiment, the color mosaic filter 401 comprises R, G, and B filter elements. However, the filter 401 may comprise complementary color filter elements such as cyan and yellow filter elements. In any case, the color separator circuit 406 separates the color signals representing the color components constituting the color mosaic filter 401. The R, G, and B component signals are converted into Y, R-Y, and B-Y signals by a matrix circuit 407. The Y, R-Y, and B-Y signals are converted into an NTSC signal by an NTSC encoder 408. The NTSC signal is converted into a digital signal by an A/D converter 409. This digital signal is stored in one of frame memories 411-1 to 411-m by a selector 410.

The n (n≦m) images input while the in-focus position is properly changed are stored in n memories of the memories 411-1 to 411-m. The apparatus also includes an FFT arithmetic element 411, a comparator 413, multipliers 414-1 to 414-P, a memory 415, an adder 416, a frame memory 417, a D/A converter 418, a TV monitor 419, and a controller 420. The same processing as in the first embodiment is performed in the seventh embodiment.

In this embodiment, the endoscopic image obtained by the single-plate color imaging device 402 using the color mosaic filter 401 is converted into the NTSC signal. The converted color image signal is processed by the means of the present invention. According to this embodiment, therefore, the apparatus size can be reduced, and the same effect of the endoscopic image as in the sixth embodiment of the present invention can be obtained.

Eighth Embodiment

FIGS. 11A to 11D show an arrangement of an eighth embodiment. This embodiment is designed to reproduce an image having a large focal depth from a small input image. Fourier-transformed images obtained from images having different in-focus planes are weighted in units of spatial frequencies, by using a weighting coefficient calculated so as to perform recovery processing with desirable S/N. In the eighth embodiment, the invention is advantageously applied to a reflection-type microscope by which a semiconductor IC having a layer structure is checked. For setting conditions for checking, a "pre-processing" step and a "main processing" step are performed.

In the "pre-processing" step, an observer observes a microscopic image of an object, while moving a stage 501 of a microscope 500 in the direction of an optical axis. The stage 501 is vertically moved by a motor 502. The motor 502 is driven by a motor driver 503. The motor driver 503 is controlled by a stage drive controller 601 arranged in a processor 601. The stage drive controller 601 is connected to a man-machine interface 510. Thus, the observer can freely move the stage 501 in the vertical direction. While seeing the microscope image of the object or the semiconductor IC, the observer sets a focal point on the uppermost layer, and then on lower layers sequentially. When the focal point has been set on each layer, he depresses a predetermined key on the man-machine interface 510. Consequently, an in-focus signal is supplied from the man-machine interface 510 to the stage drive controller 601. The motor driver 503 has means for detecting the position of the stage 501. Positional data representative of the position detected by this means is fed back to the stage drive controller 601. The positional data, which is obtained at the time the stage drive controller 601 has received the in-focus signal from the man-machine interface 510, is stored in an internal memory of the stage drive controller 601.

On the other hand, a microscopic image, which is obtained at the time the in-focus signal has been generated from the man-machine interface 501, is photographed by a TV camera arranged above a lens-barrel of the microscope 500. An image pickup signal is supplied from the TV camera 520 to an A/D converter 611, and is converted to digital data. The digital data is stored in a memory 613-1 through a selector 612. The data stored in the memory 613-1 is fed to an FFT arithmetic element through a selector 621 and is subjected to two-dimensional Fourier transformation. Finally, a real-number component of the data is stored in the memory 613-1, and an imaginary-number component of the data is stored in a memory 613-2. The Fourier-transformed image data components stored in the memories 613-1 and 613-2 are respectively supplied to multipliers 615-1 and 615-2 through selectors 614-1 and 614-2. Each of the real-number component and imaginary-number component is squared. The resulting two squared values are added by an adder 616. Thus, a power spectrum of the Fourier-transformed image is given as follows:

$$\begin{aligned}\Phi(fx, fy) &= F(fx, fy) \cdot F^*(fx, fy) \\ &= \{F_R(fx, fy) + iFi(fx, fy)\}\{F_R(fx, fy) - iFi(fx, fy)\} \\ &= F_R(fx, fy)^2 + Fi(fx, fy)^2\end{aligned}$$

(where $F(fx, fy) = F_R(fx, fy) + iFi(fx, fy)$ indicates a Fourier-transformed image)

Hereinafter, for simplifying the formulae, $\Phi(fx, fy)$ is abbreviated as "$\Phi$", and $F(fx, fy)$ is abbreviated as "F", in some cases.

The added value is stored in a memory 618 through a selector 617. In like manner, power spectra of images focused on the respective layers of the IC are sequentially stored in the memory 618. Simultaneously, data on positions of focal planes of the stage 501 is stored in the memory in the stage drive controller 601. It is supposed that the total number of focal planes of the IC, which are selected by the observer, is n.

The data on positions of focal planes stored in the stage drive controller 601 is supplied to an address signal generator 602 and converted to a predetermined address signal. The address signal is stored in a read-only memory (ROM) 603. The ROM 603 stores, in advance, some image degradation function (i.e., "blurring" function) values $H_{jk}$. Each of the image degradation function values $H_{jk}$ is representative of a degree of degradation of the image of a k-th layer when a j-th layer (in-focus plane) is focused. The degradation of the image depends on a distance between the j-th layer and the k-th layer. Namely, when z denotes an optical-axis coordinate, $Z_j$ denotes the position of the j-th layer, and $Z_k$ denotes the k-th layer, the following formula (1) is given:

$$H_{jk} = H(Z_j, Z_k) = H(|Z_j - Z_k|) \quad (1)$$

Thus, based on the position $Z_j$ (i = 1, 2 ... n) of the selected in-focus plane, the image degradation function value $H_{jk}$ corresponding to two planes (j-th layer and k-th layer) is found. Since the number of image degradation function values stored in the ROM 603 is limited, the number of degradation function values corresponding to a distance between two freely selected layers ($|Z_j - Z_k|$) is also limited. However, there is no practical problem, if a degradation function value is selected. When an i-th layer is focused, a spatial frequency value $H_{ip}$ (fx, fy) corresponding to an image degradation function value $H_{ip}$ of a selected p-th layer is output from the ROM 603. The value Hip (fx, fy) is held in a latching circuit 605 through a selector 604. While the i-th layer is focused, a spatial frequency value $H_{iq}$ (fx, fy) corresponding to an image degradation function value $H_{iq}$ of another selected q-th layer is output from the ROM 603. The value $H_{iq}$ (fx, fy) is supplied to a multiplier 606 through the selector 604. In the multiplier 606, the value $H_{iq}$ (fx, fy) is multiplied by the value Hip (fx, fy) held in the latching circuit 605. The multiplication result is supplied to a multiplier 631 through a selector 607.

The spatial frequency value $\Phi i$ (fx, fy) of the i-th spectrum $\Phi i$ of the power spectra $\Phi$ corresponding to the respective layers is read out from a memory 618. The read-out value $\Phi i$ is sent to the multiplier 631 through a selector 619 and is multiplied by the output from the selector 632. An output of the multiplier 631 is delivered to an adder 633 through a selector 632. On the other hand, data stored in a buffer memory 635 is input to the adder 633 through a selector 636. Thus, the outputs from the selectors 632 and 636 are added by the adder 633. The added result is input to the buffer memory 635 through a selector 634, and the contents in the buffer memory 635 are updated. This operation is repeated with respect to different values of i (= 1, 2 ... n). Thereafter, the data in the buffer memory 635 is input to a divider 637. The data stored in the buffer memory 635 is divided by a value S stored in a ROM 638 by the divider 637. The value S output from the ROM 638 represents a spectrum level of noise. The ratio {($\Phi i$ (fx, fy)/S)} of the spectrum value $\Phi i$ (fx, fy) to the value S corresponds to an S/N at the spatial frequency (fx, fy). The spectrum level of noise S is guessed, in advance, as "a priori" data, and is stored in the ROM 638. An output of the divider 637 is supplied, as one input, to the adder 633 through the selector 632. A value "1" is read out from the ROM 638 and is supplied, as the other input, to the adder 633 through the selector 636. The two inputs are added by the adder 633, and the added result is stored in a memory 639 through the selector 634. Subsequent to the above operation, the memory 639 stores three values given by the formulae (2) to (4):

$$App = 1 + \frac{1}{S} \sum_{i=1}^{n} \Phi i |Hip|^2 \quad (2)$$

$$App = \frac{1}{S} \sum_{i=1}^{n} \Phi i \, Hip \, Hiq \quad (3)$$

$$Aqq = 1 + \frac{1}{S} \sum_{i=1}^{n} \Phi i |Hiq|^2 \quad (4)$$

On the other hand, image degradation function values $H_{ip}$ (fx, fy) and $H_{iq}$ (fx, fy) of the layers p and q at the spatial frequency (fx, fy) stored in the ROM 603, which are found when the i-th layer is focused are input to the multiplier 631 through the selectors 604 and 607. The function values $H_{ip}$ (fx, fy) and $H_{iq}$ (fx, fy) are multiplied by the power spectrum $\Phi i$ (fx, fy) in the multiplier 631. The multiplication result is subjected to n times of cumulative adding operations using the adder 633 and the buffer memory 635. Thereafter, the resulting signal is divided by the spectrum level of noise S read out from the ROM 638 in the divider 637. The divided result is stored in the memory 639. In this manner, the memory 639 stores two new values given by the formulae (5) and (6):

$$Bp = \frac{1}{S} \sum_{i=1}^{n} \Phi i \, Hip \quad (5)$$

-continued $$Bq = \frac{1}{S} \sum_{i=1}^{n} \Phi i \, Hiq \qquad (6)$$

Two layers in a middle region of n layers selected by the observer are chosen as the two layers p and q. It is also possible to choose the layers p and q, based on the value of the power spectrum Φi.

The data stored in the memory 639 is subjected to a multiplying operation through a selector 640, a latching circuit 641 and a multiplier 642. Consequently, six values $A_{pp} \cdot A_{qq}$, $A_{pq}2$, $A_{qq}B_p$, $A_{pq}B_q$, $A_{pp}B_q$, and $A_{pq}B_p$ are stored in a first-stage memory 643. The data stored in the memory 643 is subjected to a subtraction operation through a selector 644, a latching circuit 645, and a subtracter 646. The resulting three values, $A_{pp} \cdot A_{qq} - A_{pq}2$, $A_{qq}B_p - A_{pq}B_q$, and $A_{pp}B_q - A_{pq}B_p$ are stored in a second-stage memory 647. The data stored in the memory 647 is subjected to a dividing operation through a selector 648, a latching circuit 649 and a divider 650. One of the resulting values, which is given by $$\omega_p = \frac{1}{A_{pp}A_{qq} - A_p^2{}_q} (A_{qq}B_p - A_{pq}B_p) \qquad (7)$$

is stored in a memory 652-1 through a selector 651. The other of the resulting values, which is given by $$\omega_q = \frac{1}{A_{pp}A_{qq} - A_p^2{}_q} (A_{pp}B_q - A_{pq}B_p) \qquad (8)$$

is stored in a memory 652-2 through the selector 651. After the completion of the above operation, coefficient values ωp and ωq for all spatial frequencies of the input digital images are calculated. The calculated coefficient values are stored in the memories 652-1 and 652-2.

The "main processing" in the eighth embodiment will no be described. After the above-described "pre-processing", the observer moves the stage 501 in a horizontal direction, i.e., a direction perpendicular to the optical axis, thus checking a given point on the object. In this case, a command is delivered to the motor driver 503 from the stage drive controller 601, so as to set a focal point on the layer p. An image obtained by the TV camera 520 is converted to digital image data by the A/D converter 611. The digital image data is stored in the memory 613-1 through the selector 612. Similarly, an image obtained by the TV camera 520 when the focal point is set on the layer q is stored in the memory 613-2. These digital image data units are subjected to two-dimensional Fourier transformation by the FFT arithmetic element 622. The Fourier-transformed image data units are again stored in the memories 613-1 and 613-2. The Fourier-transformed image data units are read out in units of spatial frequencies. The read-out data units are input to the multipliers 615-1 and 615-2 through the selectors 6141 and 614-2. Also, the coefficient values $\omega_p$ and $\omega_q$ corresponding to the spatial frequencies store din the memories 652-1 and 652-2 are input to the multipliers 615-1 and 615-2. The Fourier-transformed image data units are multiplied by the coefficient values, the multiplication results of the multipliers 615-1 and 615-2 are added by the adder 616. The added result is stored in the memory 618. In other words, Fourier components of image data obtained when focal points are set on the layer p and layer q are weighted in units of spatial frequencies with the coefficient values $\omega_p$ and $\omega_q$. This operation is represented by the following formula:

$$Fa = \omega_p F_p + \omega_q F_q;$$

where Fp and Fq denote Fourier-transformed image data units obtained when focal points are set on the layers p and q.

The calculation result of weight is stored in the memory 618. The weighted Fourier-transformed image data stored in the memory 618 is then subjected to inverted Fourier transformation by the FFT arithmetic element 622. Then, the resulting data is once again stored in the memory 618. The stored data is converted by a D/A converter 620 to an analog video signal, and the analog video signal is displayed on a TV monitor 700.

This "main processing" is repeated each time the position of the stage 501 is changed, and processed images are successively displayed. It is possible to automatically change the horizontal position of the stage 501 by using a motor designed to control the horizontal movement of the stage 501.

The above-described processing is controlled by a controller 660 included in the processor 600. For the sake of brevity, a description of line connection of the controller 600 may be omitted.

Figure 12:
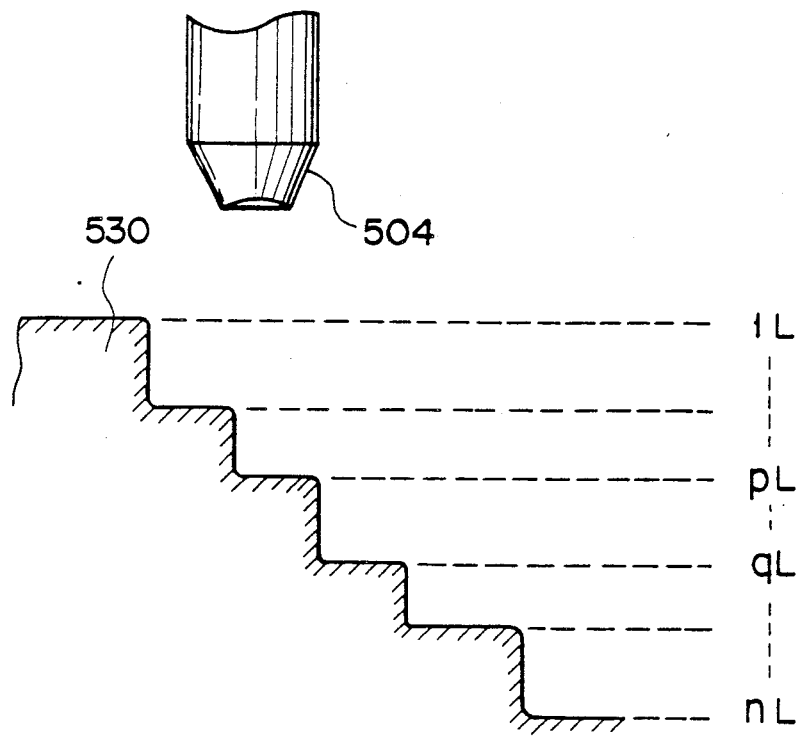

According to the eighth embodiment, when a semiconductor IC 520 having n layers, as shown in FIG. 12, is checked, an image of the IC, which is obtained when focal points are set only on arbitrarily selected two layers pL and qL, is input and processed, whereby an image having in-focus points at each layer can be displayed. The operation of the apparatus according to the eighth embodiment will now be described.

Suppose that an image of the k-th layer is represented by fk(x,y), an image obtained by subjecting the image fk to Fourier transformation is denoted by $F_k(fx, fy)$. Also, suppose that a degradation function (i.e., OTF: Optical Transfer Function) of the k-th layer, which is observed when a focal point is set on a j-th layer, is represented by symbol $H_{jk}(fx, fy)$, and additive noise mixed in the input image obtained when the focal point is set on the j-th layer is represented by $N_j(fx, fy)$. In this case, Fourier-transformed image data $G_j(fx, fy)$ obtained from the input image when the focal point is set on the j-th layer is given by $$G_j(fx, fy) = \sum_{k=1}^{n} H_{jk}(fx, fy) \cdot F_k(fx, fy) + N_j(fx, fy) \qquad (9)$$

Also, Fourier-transformed image data Fo of an image to be obtained finally is given by $$F_o(fx, fy) = \sum_{k=1}^{n} F_k(fx, fy) \qquad (10)$$

In the present invention, Fourier-transformed images input when focal points are set on different layers are weighted in units of spatial frequencies. If a weighting coefficient for the input image $G_j$ is $\omega_j$, the processed image is given by $$F(fx, fy) = \sum_{j=1}^{2} \omega_j(fx, fy) \cdot G_j(fx, fy) \qquad (11)$$

It is thus necessary to find the coefficient $\omega_j$ which can reduce a difference in value between formulae (10) and (11) to a minimum. An average squared error E between the values of formulae (10) and (11) is represented by $$E = <|F0 - F|^2> \quad (12)$$

$$= \left\langle \left| \sum_{k=1}^{n} F_k - \sum_{j=1}^{2} \omega_j \left( \sum_{k=1}^{n} H_{jk} \cdot F_k + N_j \right) \right|^2 \right\rangle$$

$$= \sum_{k=1}^{n} \Phi_k \left| 1 - \sum_{j=1}^{2} \omega_j H_{jk} \right|^2 + S \sum_{i=1}^{2} |N_j|^2$$

where a statistical average power spectrum $\Phi k$ of the k-th layer is given by $$\Phi_k(fx, fy) = <|F_k(fx, fy)|^2> \quad (13)$$
$$= <|F_k(fx, fy) \cdot F_k^*(fx, fy)|^2>$$

In the above formulae (12) and (13), it is supposed that the additive noise is white noise, a spectrum density is S, and images of layers have no relation with each other ($F_u \cdot F_u^* = \delta_{uu}$). The symbol $<\cdot>$ denotes an operator representative of an average value of aggregation.

In order to obtain a minimum value in the formula (12), the value $\Phi_i$ is differentiated by $\omega_j$, and is set to 0.

$$\frac{\partial}{\partial \omega_j} E = 2 \sum_{k=1}^{n} \Phi_k |H_{kj}|^2 \omega_j + \sum_{k=1}^{n} \Phi_k H_{kl} H_{kj} \omega_l - \quad (14)$$

$$2 \sum_{k=1}^{n} \Phi_k H_{kj} + 2S\omega_j = 0$$

where $j=p, q; l=p, q$ ($j \neq l$).

The optical transfer function OTF or the value H is supposed to be a real variable function having no phase. The formula (14) ay be developed as follow:

$$\left\{ 1 + \sum_{k=1}^{n} \frac{\Phi_k}{S} |H_{kj}|^2 \right\} \omega_j + \frac{1}{2} \sum_{k=1}^{n} \frac{\Phi_k}{S} H_{kl} H_{kj} \omega_l = \quad (15)$$

$$\sum_{k=1}^{n} \frac{\Phi_k}{S} H_{kj}$$

From formula (15), two formulae wherein $j=p$ and $j=q$ are established. These formulae are represented by a matrix, as follows:

$$\begin{pmatrix} 1 + \sum_{k=1}^{n} \frac{\Phi_k}{S} |H_{kp}|^2 & \sum_{k=1}^{n} \frac{\Phi_k}{S} H_{kq} H_{kp} \\ \sum_{k=1}^{n} \frac{\Phi_k}{S} H_{kp} H_{kq} & 1 + \sum_{k=1}^{n} \frac{\Phi_k}{S} |H_{kq}|^2 \end{pmatrix} \begin{pmatrix} \omega_p \\ \omega_q \end{pmatrix} = \quad (16)$$

$$\begin{pmatrix} \sum_{k=1}^{n} \frac{\Phi_k}{S} H_{kp} \\ \sum_{k=1}^{n} \frac{\Phi_k}{S} H_{kq} \end{pmatrix}$$

If the matrix elements in the formula (16) corresponding to the spatial frequencies are represented as in formulae (2) to (6), the following formula is obtained:

$$\begin{pmatrix} A_{pp} & A_{pq} \\ A_{pq} & A_{qq} \end{pmatrix} \begin{pmatrix} \omega_p \\ \omega_q \end{pmatrix} = \begin{pmatrix} B_p \\ B_q \end{pmatrix} \quad (17)$$

The solutions of formula (17) are as follows:

$$\omega_p = \frac{1}{A_{pp}A_{qq} - A_{pq}^2} (A_{qq}B_p - A_{pq}B_q) \quad (18)$$

$$\omega_q = \frac{1}{A_{pp}A_{qq} - A_{pq}^2} (A_{pp}B_q - A_{pq}B_q) \quad (19)$$

The above-described "pre-processing" is performed so as to calculate the solutions represented by the formulae (18) and (19). In the formulae (16) and (19), the symbol $\Phi_i/S$ denotes an S/N. Though this value is, in principle, found based on statistical guess, the guess is difficult in fact. Thus, the value $\Phi k$ is replaced with a power spectrum $\Phi k$ of an image input when the observer sets a focal point on each layer of the object in the "pre-processing" stage. Also, the spectrum density of noise is set to a suitable value, taking into consideration the characteristic of the TV camera, etc., in advance.

In the eighth embodiment, the weighting coefficient corresponding to each spatial frequency is found by taking into consideration the degradation function of each layer, which occurs when a focal point is set on each layer, which occurs when a focal point is set on each layer, and the S/N, and utilizing a method of minimum square filter. Thus, based on input images of a small number of layers, an image having in-focus points on all layers can be reproduced. In this embodiment, the semiconductor IC having four to five layers was employed, and the number of input images was two. When the number of layers of an object is very large, the number of input images may be increased to m number. In this case, the matrix of the formulae (16) and (17) becomes a formula composed of m equations. A processor for solving m-element simultaneous equations needs to be constituted.

As described above, in the eight embodiment, the weighting coefficient is set so as to attain the effect of the recovery processing with an improved S/N. Thus, an image having a large focal depth can be reproduced, based on a small number of input images. If the necessary conditions are set in the "pre-processing", image processing in the "main processing" stage can be completed in a short time period.

Ninth Embodiment

Figure 13:
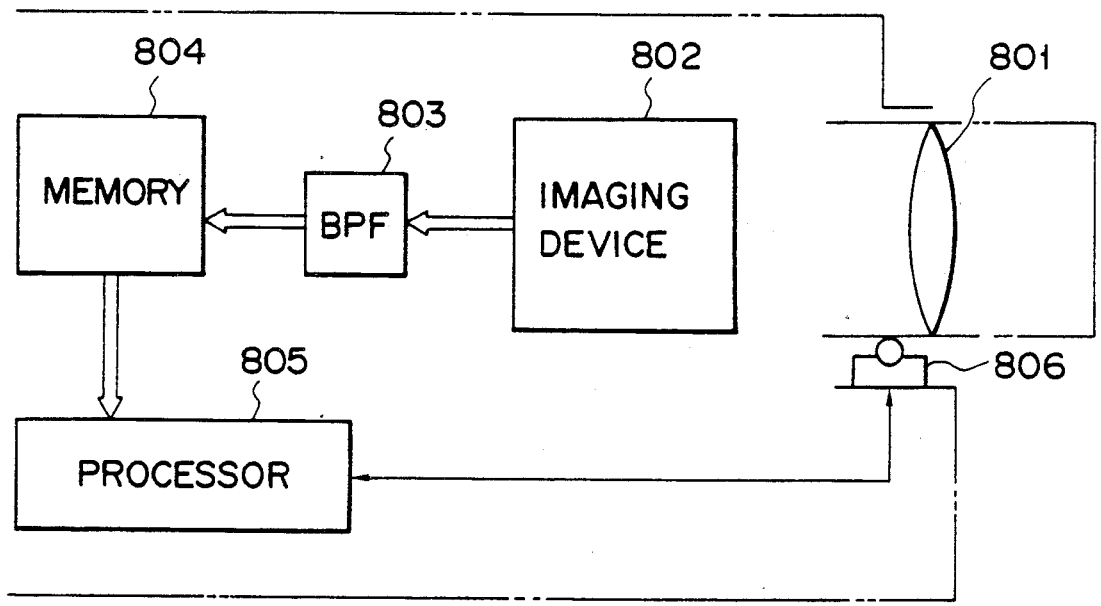

FIG. 13 shows an arrangement of a ninth embodiment which relates to means for selecting a focal plane of an input image. In a pre-processing stage, the position of a in-focus position control device 806 is adjusted, and an image focused by a lens system 806 is photographed by an image pickup element 802. An output from the image pickup element 802 is passed through a band-pass filter 803, and only a signal having a predetermined frequency band is extracted. The spectrum intensity of the extracted signal is stored in a memory 804. The memory 804 stores spectrum intensities in the frequency band of images having different in-focus planes. A processor 805 sets an in-focus plane of an input image for performing the "main processing" based on the respective spectrum intensities. A command signal representative of this in-focus plane is supplied from the processor 805 to the in-focus position control device 806. The in-focus position control device 806 is provided with an encoder for obtaining focus position data of the lens system 801. The focus position data is fed back to the processor 805.

FIGS. 14 and 15 are views for explaining an operation of the ninth embodiment. An object 810 has a surface structure as shown in FIG. 14. If the image of object 810 is picked up b an optical system having a small focal depth, an image having an in-focus point at some area on the object 810 and an image having no in-focus point are obtained. A fourier spectrum of the former image has a relatively high spatial frequency component, whereas a Fourier spectrum of the latter image has only a low spatial frequency component. This feature is illustrated in the right side portion of FIG. 14. Namely, the right portion of FIG. 14 shows Fourier spectra F(u) of images obtained when in-focus planes are set in positions of the object 810 which are indicated by broken lines. Regarding the spectra shown in FIG. 14, FIG. 15 illustrates how a value F (u1, u2), which is obtained by integrating only a hatched area of the spectra of a given spatial frequency region (u1, u2), varies when the position of the in-focus plane is changed.

From FIG. 15, it is understood that images of regions other than a region (z1−z2), where the value F (u1, u2) exceeds a predetermined threshold value, that is, images having no in-focus point, can be excluded from the scope of images to added. A s a result, a clearer image having a large focal depth can be obtained.

According to the ninth embodiment, since the scope of in-focus planes of input images is predetermined by pre-processing, the main processing can be efficiently performed, and a clearer image can be reproduced.

As shown in the first to third embodiments, the apparatus of the present invention is provided with the image memories and the FFT arithmetic element. Thus, the processing in the ninth embodiment can also be carried out, without using the structure shown in FIG. 13, and only by Fourier-transforming digital input images and finding the spectrum intensity of a specific frequency region.

Tenth Embodiment

Figure 16:
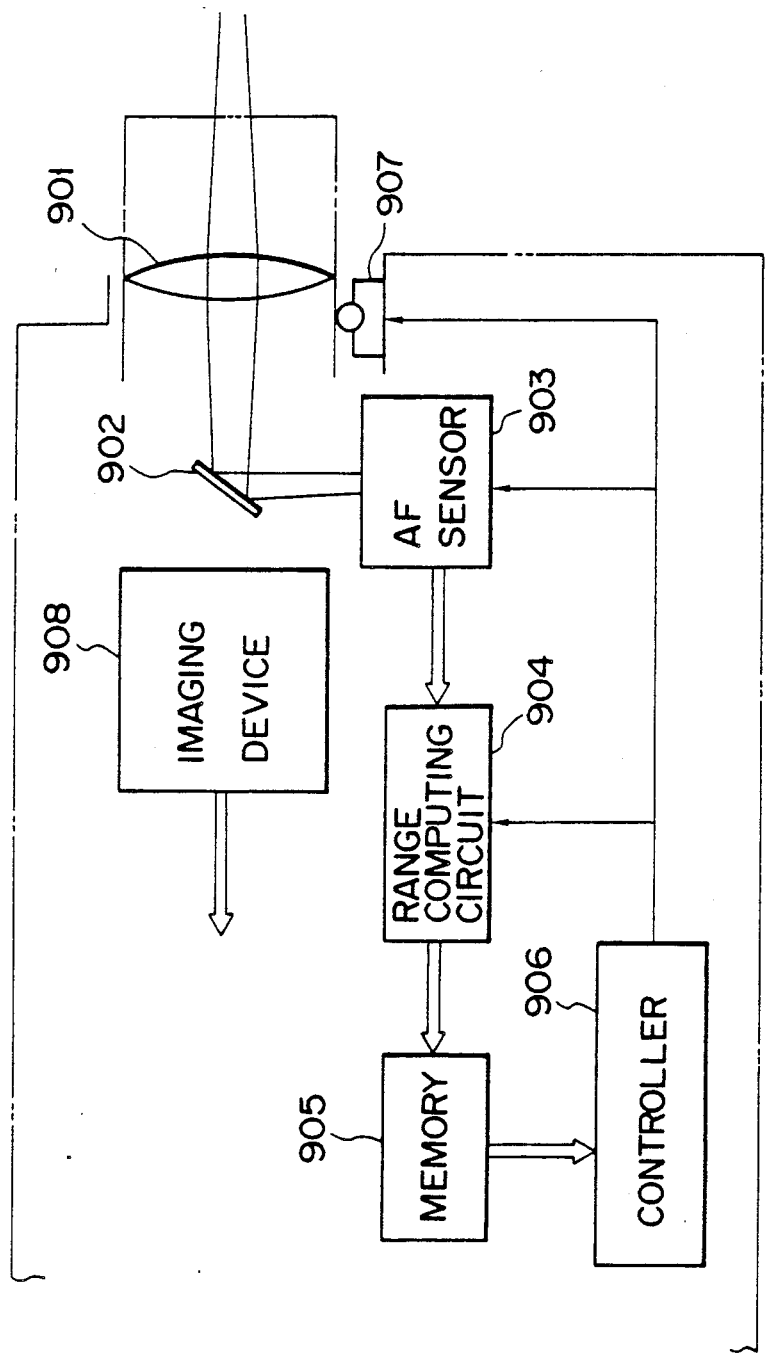

FIG. 16 shows an arrangement of a tenth embodiment which relates to means for selecting a focal plane of an input image, like in the ninth embodiment.

An image of an object, which is transmitted through a center region of a lens system 901, is reflected by a mirror 902, and is input to an auto-focus (hereinafter, called "AF") sensor 903. The AF sensor 903 employs a phase error AF system. In other words, the AF sensor 903 produces data representative of a phase error between two images focused with a parallax, and supplies the data to a range computing circuit 904. Based on the data sent from the AF sensor 903, the range computing circuit 904 calculates a distance between a camera and the object. The data representative of the calculated distance is stored in a memory 905. This operation is repeated with respect to several objects selected by the operator. The distance data relating to the several locations on the object, which is stored in the memory 905, is sent to a controller 906. Thus, conditions for "main image pickup" operation are determined.

When a range computing button is depressed in the state wherein a plurality of objects, which are to be set in focus simultaneously, are set in a center region of a finder, data representative of a distance between each object and the camera is stored in the memory 905. Then, the controller 906 determines input conditions based on the stored distance data.

According to the tenth embodiment, the input conditions can be determined so that all objects selected by the operator may be set in focus.

As a modification of the tenth embodiment, it is possible to constitute a pre-processing device only by the controller 906 and the in-focus point controlling device 907. In this case, as in the above-manner, the operator sets the objects in focus sequentially by a manual operation and simultaneously depresses the range computing button. Subsequently, positional data representative of the in-focus plane is supplied from an encoder provides in the in-focus point control device 907 to the controller 906. Based on the positional data, the controller 906 is operated so that the images of the selected objects are sequentially focused, input and processed in the "main image pickup" operation.

What is claimed is:

1. An image input/output apparatus for inputting-/outputting image information, comprising:
    focusing means for performing in-focus operations on a plurality of different object planes;
    inputting means for inputting a plurality of images focused on the different object planes by said focusing means;
    Fourier-transforming means for Fourier-transforming the plurality of images input by said input means to produce Fourier-transformed images;
    weighting and adding means for weighting the Fourier-transformed images produced by said Fourier-transforming means, and for adding the weighted Fourier-transformed images;
    means for setting weighting coefficients for weighting the Fourier-transformed images so as to be proportionate to spectral intensities corresponding to the respective spatial frequencies of the images; and
    means for performing inverse Fourier transform of the Fourier-transformed images weighted and added by said weighting and adding means.

2. An apparatus according to claim 1, wherein said inputting means for inputting a plurality of images focused on the different object planes includes a plurality of image pickup devices arranged on a plurality of image faces, and wherein the images focused on the different object planes are simultaneously input by said image pickup devices.

3. An apparatus according to claim 1, wherein:
    said inputting means for inputting a plurality of images focused on the different object planes includes filtering means for performing band-pass filtering; and
    said focusing means for performing in-focus operations on different object planes includes selecting means for selecting a range of variation in position of the in-focus object planes, based on an output from said filtering means.

4. An apparatus according to claim 1, wherein said focusing means for performing in-focus operations on different object planes includes:

distance computing means for computing a distance between an object and an image pickup device; and selecting means for selecting a range of variation in position of the in-focus object planes, based on distance data obtained by said distance computing means.

5. An apparatus according to claim 1, wherein said weighting and adding means includes means for calculating weighting coefficient so as to bring about a recovery effect of an image degradation, while taking into account the signal-to-noise ratio (S/N) of input images and a degradation coefficient.

6. An apparatus according to claim 5, wherein each of said weighting coefficients for bringing about the recovery effect of the image degradation has a value with which a processed image, obtained by multiplying an input image by each of said coefficients, is made closest to an ideal target image without degradation.

7. An apparatus according to claim 6, wherein said ideal target image is an image which is focused on all of the object planes contained in said plurality of input images, and each of said coefficients with which said processed image is made closest to said ideal target image is a coefficient with which the mean-square restoration error between said ideal target image and said processed image is minimized.

8. An image input/output apparatus for inputting/outputting image information, comprising:

focusing means for performing in-focus operations on a plurality of different object planes;

inputting means for inputting a plurality of images focused on the different object planes by said focusing means;

Fourier-transforming means for Fourier-transforming the plurality of images input by said input means to produce Fourier-transformed images;

weighting and adding means for weighting the Fourier-transformed images produced by said Fourier-transforming means, and for adding the weighted Fourier-transformed images;

means for setting one of weighting coefficients for weighting the Fourier-transformed images, which corresponds to a spatial frequency higher than a predetermined spatial frequency, to a constant value (including zero); and means for performing inverse Fourier transform of the Fourier-transformed images weighted and added by said weighting and adding means.

9. An apparatus according to claim 8, wherein said inputting means for inputting a plurality of images focused on the different object planes includes a plurality of image pickup devices arranged on a plurality of image faces, and wherein the images focused on the different object planes are simultaneously input by said image pickup devices.

10. An image input/output apparatus for inputting/outputting image information, comprising:

focusing means for performing in-focus operations on a plurality of different object planes;

inputting means for inputting a plurality of images focused on the different object planes by said focusing means;

Fourier-transforming means for Fourier-transforming the plurality of images input by said input means to produce Fourier-transformed images;

weighting and adding means for weighting the Fourier-transformed images produced by said Fourier-transforming means, and for adding the weighted Fourier-transformed images; and means for performing inverse Fourier transform of the Fourier-transformed images weighted and added by said weighting and adding means;

said focusing means comprising:

another inputting means for inputting a plurality of images having different in-focus object plane positions and different wavelength ranges, said another inputting means being provided with means for changing the in-focus object plane position and means for changing the wavelength region of light;

another Fourier-transforming means for Fourier-transforming the plurality of images input by said another inputting means to provide Fourier-transformed images;

another weighting and adding means for weighting the Fourier-transformed images produced by said Fourier-transformed images produced by said Fourier-transforming means, and for adding the weighted Fourier-transformed images;

another inverse Fourier-transforming means for performing inverse Fourier transform of the images weighted and added by said another weighting and adding means; and synthesizing means for multiplying the image inverse Fourier-transformed by said another inverse Fourier-transforming means with each image subjected to a division by an image obtained by adding the input images, and for synthesizing the resultant images into one image.

* * * * *